(12) United States Patent
Sakai et al.

(10) Patent No.: US 7,532,276 B2
(45) Date of Patent: May 12, 2009

(54) LIQUID CRYSTAL DISPLAY DEVICE AND METHOD FOR PRODUCING THE SAME

(75) Inventors: Eiji Sakai, Kanagawa (JP); Shuichi Tatemori, Kanagawa (JP); Masaaki Kabe, Kanagawa (JP); Hidemasa Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 10/571,178

(22) PCT Filed: Sep. 9, 2004

(86) PCT No.: PCT/JP2004/013117

§ 371 (c)(1),
(2), (4) Date: Mar. 9, 2006

(87) PCT Pub. No.: WO2005/026831

PCT Pub. Date: Mar. 24, 2005

(65) Prior Publication Data

US 2007/0040968 A1      Feb. 22, 2007

(30) Foreign Application Priority Data

Sep. 11, 2003     (JP) ............................. 2003-320105

(51) Int. Cl.
*G02F 1/1335*     (2006.01)

(52) U.S. Cl. ...................................... 349/106; 349/114

(58) Field of Classification Search .................. 349/106, 349/114
See application file for complete search history.

(56) References Cited

U.S. PATENT DOCUMENTS

2002/0171791 A1*  11/2002  Anno et al. .................. 349/113
2003/0063240 A1*   4/2003  Takizawa ..................... 349/106

FOREIGN PATENT DOCUMENTS

JP          2002-341335          11/2002
JP          2003-172818           6/2003

* cited by examiner

*Primary Examiner*—Michael H Caley
(74) *Attorney, Agent, or Firm*—Sonnenschein Nath & Rosenthal LLP

(57) ABSTRACT

A transflective liquid crystal display device can obtain a high luminance and a high contrast to realize a superior color repeatability and improve an image quality in a color display.

In a second substrate 80, a region facing a region where a light reflection portion is formed includes a first region where a color filter layer is formed at a predetermined layer thickness and a second region where the color filer layer is not formed, and, in a first substrate, a layer thickness difference adjustment layer for adjusting a difference of a layer thickness of the liquid crystal layer generated by a height of step between the first region and the second region due to the color filter layer is formed in the region where the light reflection portion is formed so as to face the second region.

8 Claims, 14 Drawing Sheets

FIG. 1 - PRIOR ART
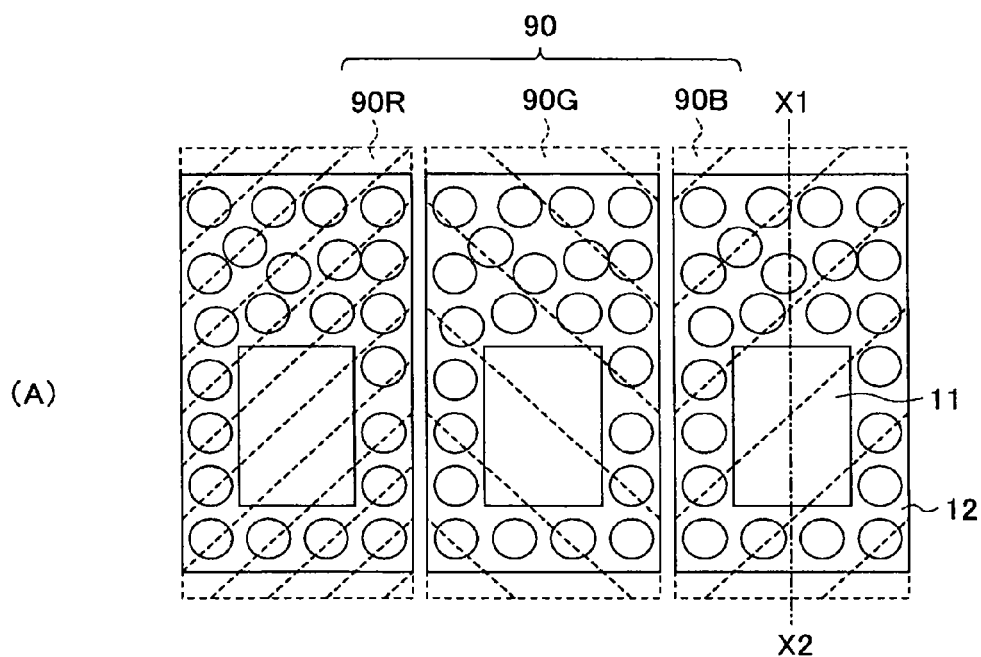
(A)
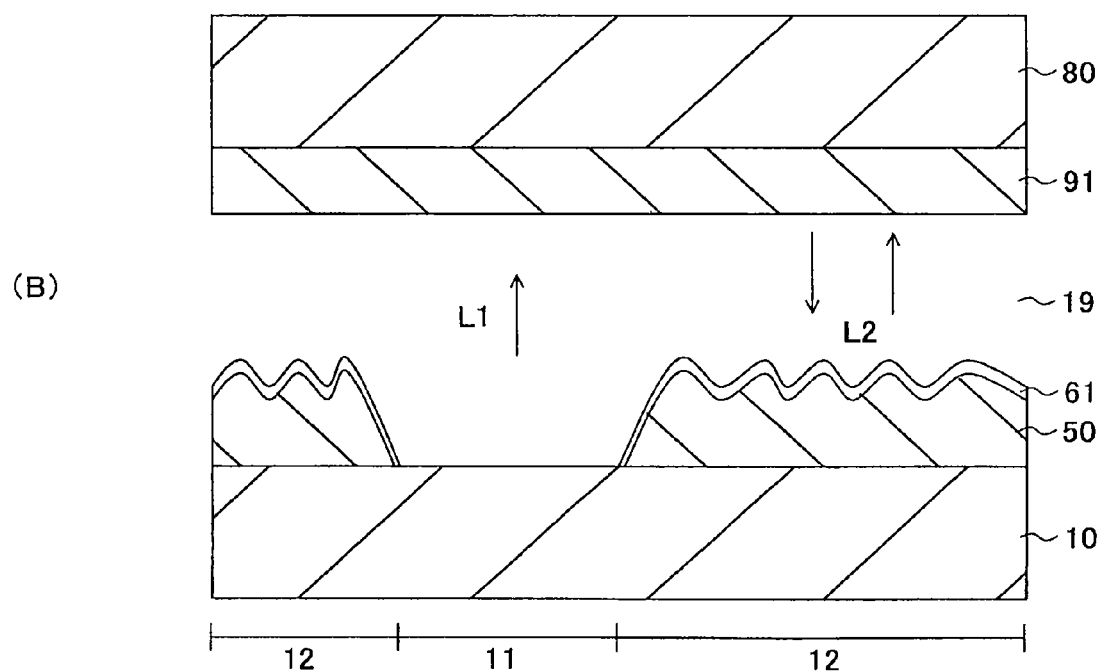
(B)

FIG. 4
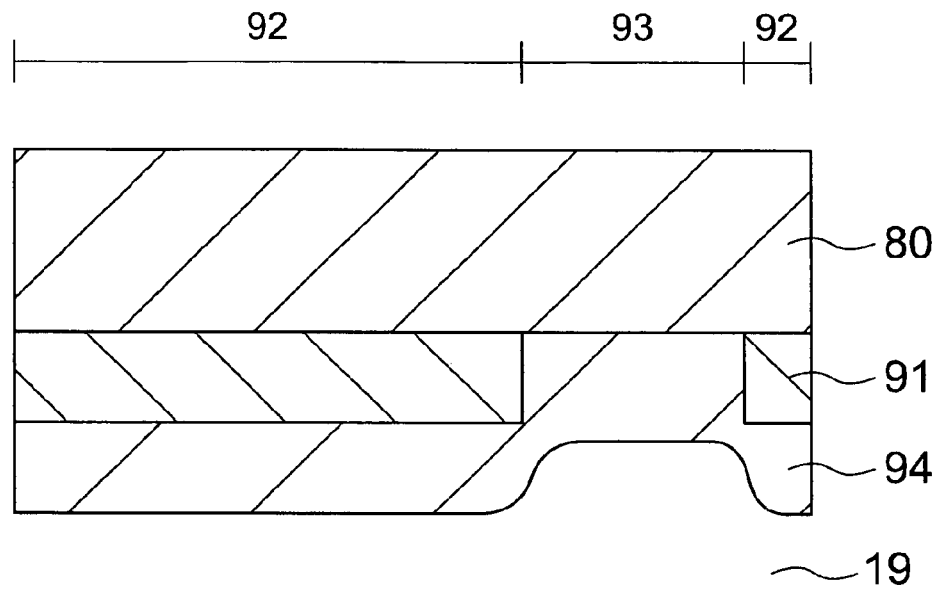
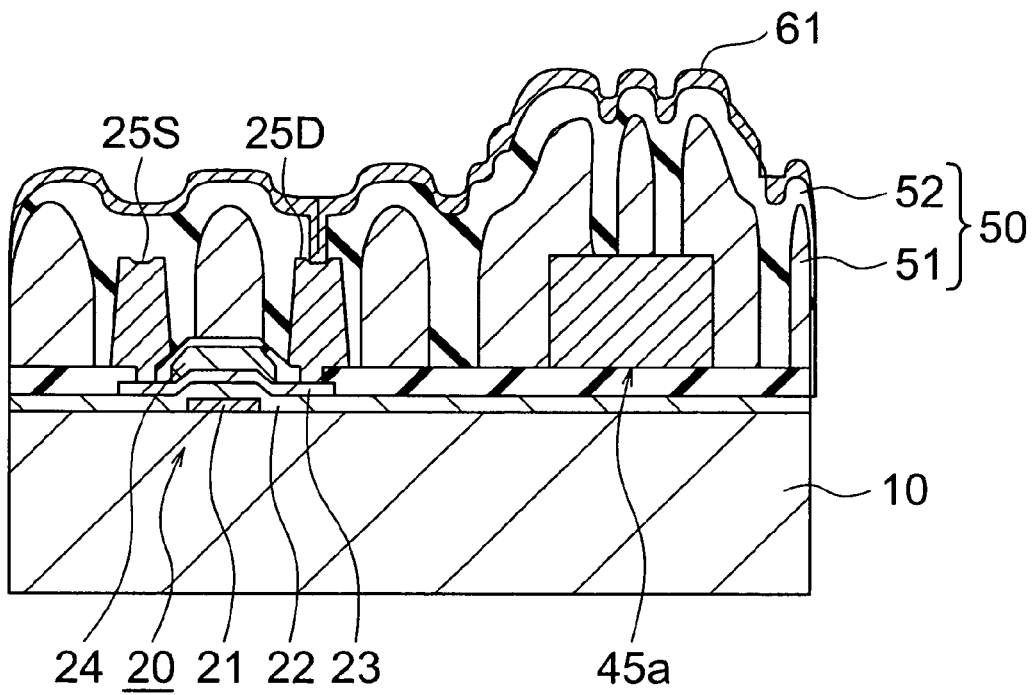

FIG. 8
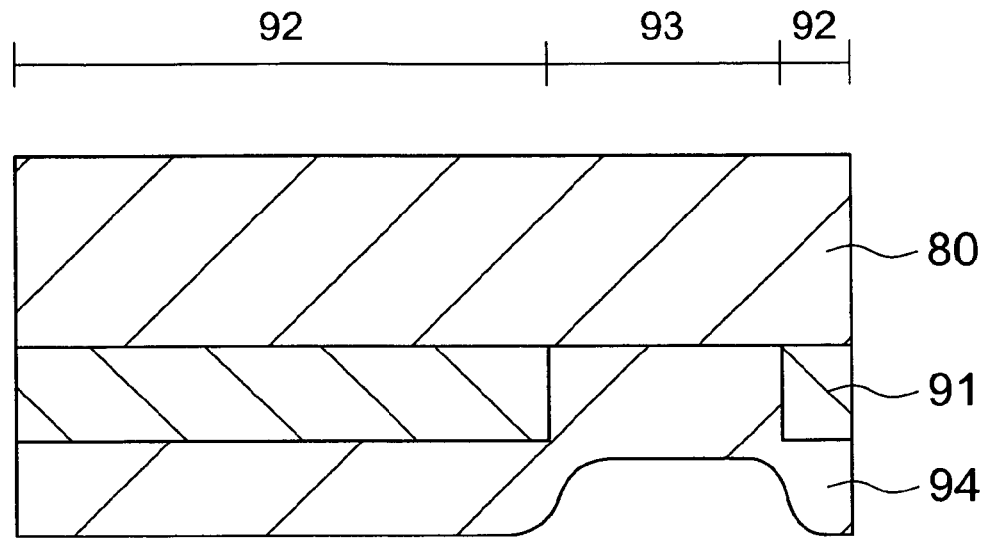
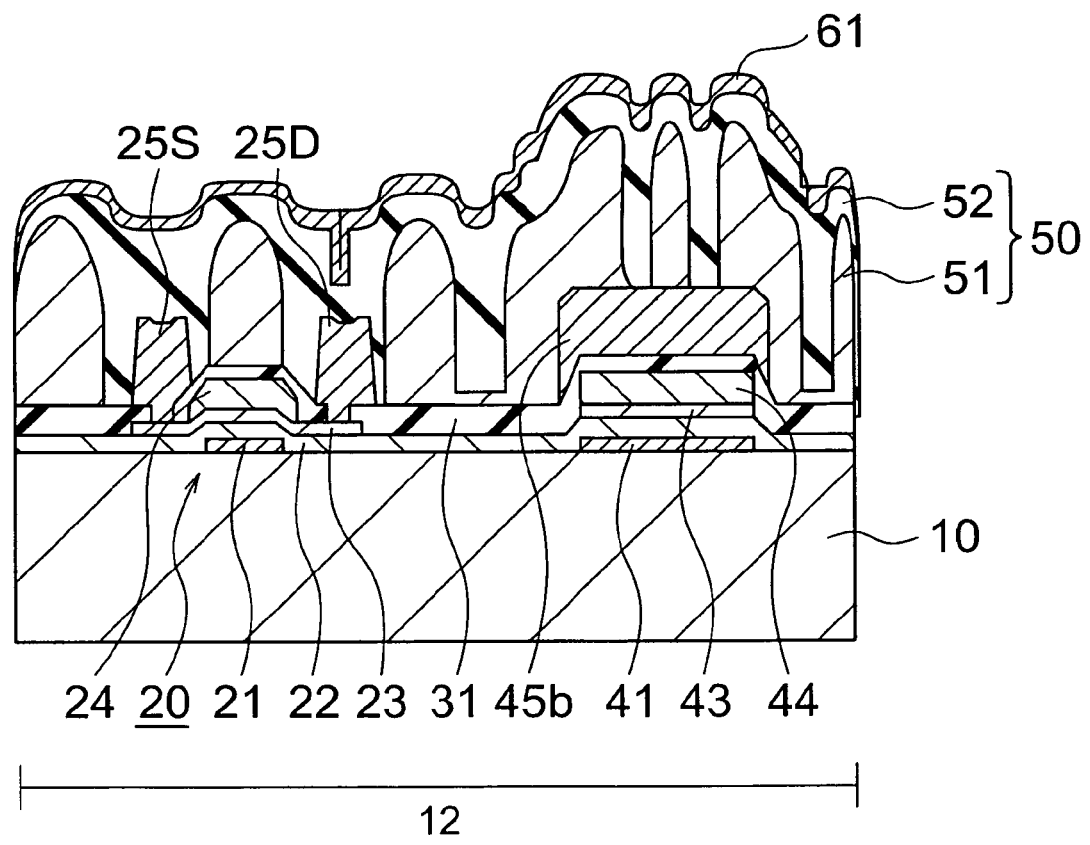

FIG. 10
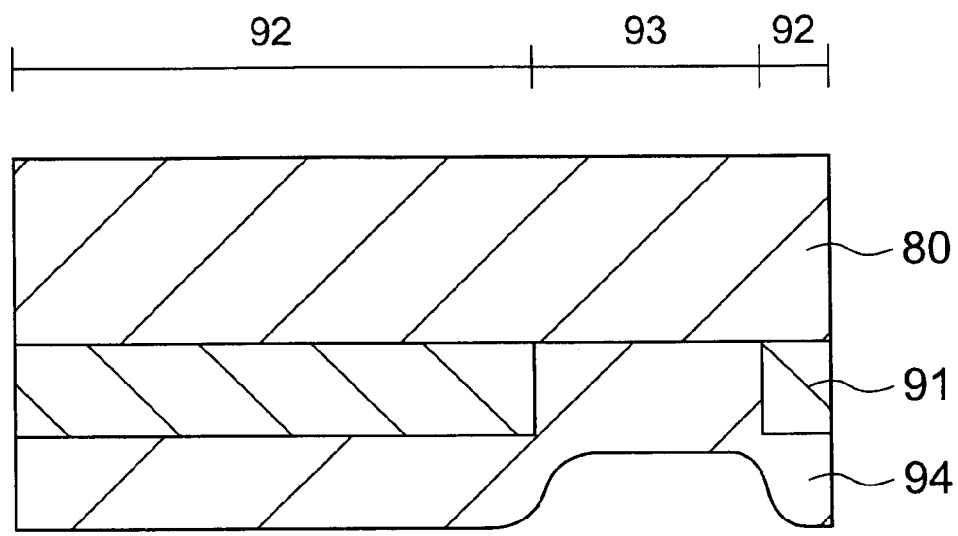
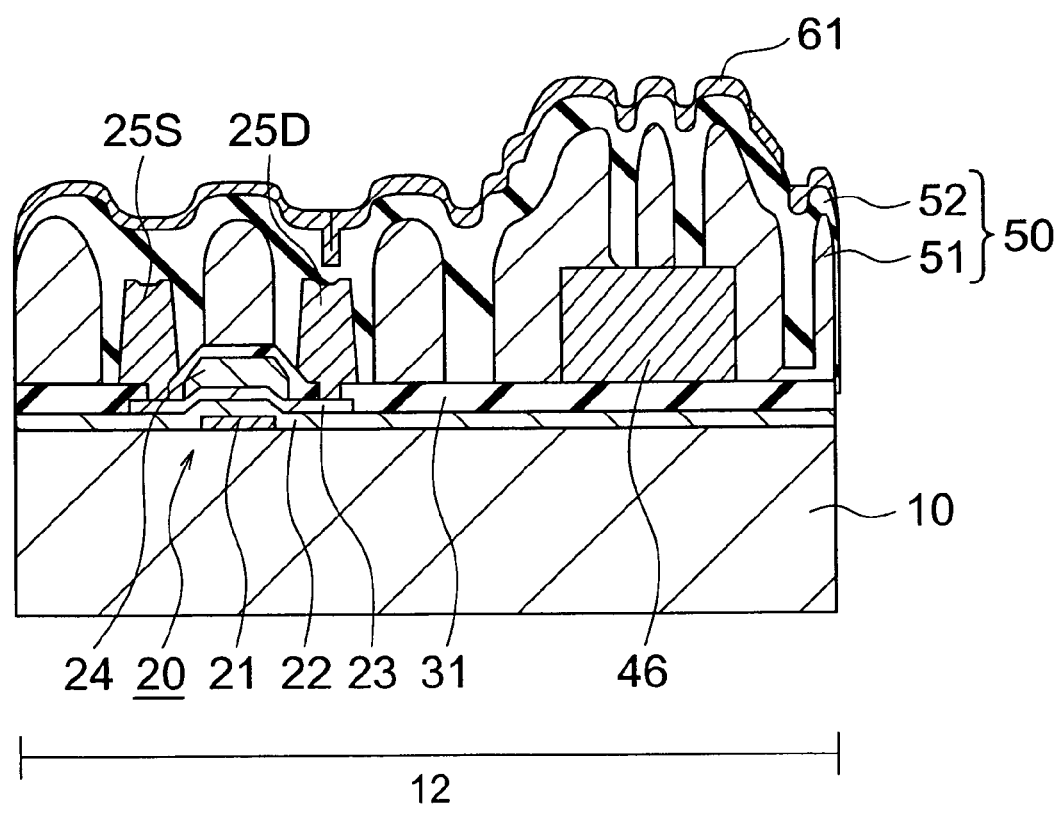

LIQUID CRYSTAL DISPLAY DEVICE AND METHOD FOR PRODUCING THE SAME

TECHNICAL FIELD

The present invention relates to a liquid crystal display device and a method for producing the same, particularly, relates to a transflective liquid crystal display device in which a reflective display and transmissive display are jointly used and a method for producing the same.

BACKGROUND ART

A liquid crystal display device has advantages of thinness, light weight, and low power consumption compared with CRT (cathode ray tube) and is applied as a display device of a personal computer, a mobile phone, a digital camera, or other electronic equipments.

The liquid crystal display device is roughly divided into a transmissive type and a reflective type. The liquid crystal display differs from CRT in that it is not self-luminescence type display. Therefore, a transmissive liquid crystal display is provided with a planar light source called a "backlight" as a light source at its back surface, in which a light illuminated from the backlight passes through a liquid crystal panel for display. Since the transmissive liquid crystal display device displays an image by using the backlight, it has advantages that it remains unaffected even when an intensity of an ambient light is weak and can display an image at a high luminance and a high contrast. However, the backlight consumes over 50% of the entire power consumption in the liquid crystal display, so the transmissive liquid crystal display device suffers from a disadvantage that a reduction of the power consumption is difficult. When the intensity of the ambient light is strong, the transmissive liquid crystal display device also suffers from disadvantages that the display thereof appears dark and the viewability deteriorates.

On the other hand, a reflective liquid crystal display device utilizes the ambient light as the light source, in which the ambient light is reflected by a reflection portion provided with for example a reflection plate, and the reflected light passes through a liquid crystal layer for display. The device displays an image on a screen by utilizing the ambient light, so the reflection plate thereof has a rough shaped surface for diffusing and reflecting a light. Such reflective liquid crystal display device differs from the transmissive liquid crystal display device in that it is not provided with the backlight, so it has an advantage of lower power consumption. However, when surroundings are dark, a reflection light is weak, consequently, disadvantages arise in that an insufficient luminance and contrast cause a deterioration of viewability. Particularly, in a color display, the reflected light is absorbed in a color filter, so an efficiency of utilization of the reflected light ends up falling, consequently, the viewability markedly deteriorates.

For overcoming the above disadvantages of the transmissive liquid crystal display device and the reflective liquid crystal display device, there is known a transflective liquid crystal display device in which the transmissive display and the reflective display are jointly used. The transflective liquid crystal display device displays an image by applying the reflection of the ambient light in a bright place or applying the backlight in a dark place.

FIG. 1 is a schematic view illustrating a configuration of a transflective liquid crystal display device in the related art. In FIG. 1, FIG. 1(A) is a plane view illustrating a surface portion of a first substrate 10, in which a color filter layer formed on a second substrate 80 is expressed by a dot line. FIG. 1(B) is a cross-sectional view illustrating a pixel portion of the liquid crystal display device along the line X1-X2 of FIG. 1(A).

As shown in FIG. 1, the transflective liquid crystal display device in the related art is provided with the first substrate 10, the second substrate 80, and a liquid crystal layer 19. The first substrate 10 is separately arranged to face the second substrate 80 and the liquid crystal layer 19 is arranged between the first substrate 10 and the second substrate 80.

A light transmission portion 11 and a light reflection portion 12 are formed in parallel in a pixel portion of the first substrate 10. The light reflection portion 12 of the first substrate 10 is a region for diffusing and reflecting the ambient light, and diffuses and reflects a front light illuminated from a second substrate 80 side through the liquid crystal layer 19. In the light reflection portion 12, a relief surface layer 50 is formed on the first substrate 10 so as to diffuse and reflect a light, and a reflection electrode 61 is formed to cover the relief surface layer 50. The reflection electrode 61 in the light reflection portion 12 is formed for example by silver.

The light transmission portion 11 is a region through which a light illuminated from the backlight passes. The backlight is provided at a surface side of the first substrate 10 opposed to the surface provided with the liquid crystal layer 19. In the light transmission portion 11, a transparent electrode (not shown) such as ITO (Indium Tin Oxide) is formed.

On the other hand, in the second substrate 80, a color filter layer 90 is formed for passing and coloring the front light and a back light. The color filter layer 90 includes a red color filter 90R, a green color filter 90B, and a blue color filter 90B of the primary colors as a set. Each of the color filters 90 is formed for example in a strip shape and overlapped each other so as to correspond to the entire region facing the light reflection portion 12 and the light transmission portion 11 of the first substrate 10.

When a display is performed by applying the transflective liquid crystal display device in the related art, in the light reflection portion 12, a front light L2 illuminated from a side to be a display surface of the second substrate 80 passes through the color filter layer 90, is reflected at the light reflection portion 12, passes through the color filter layer 90 and the liquid crystal layer 19, and illuminates the display surface of the second substrate 80, namely, the front light L2 passes through the color filter layer 90 twice. While, in the light transmission portion 11, a back light L1 illuminated from a first substrate 10 side passes through the liquid crystal layer 19 and the color filter layer 90, and illuminates the display surface of the second substrate 80, namely, the back light L1 passes through the color filter layer 90 just once. In the above way, the number of times passing through the color filter layer is different between the light reflection portion 12 and the light transmission portion 11. As a result, a luminance and a color purity are different between the light reflection portion 12 and the light transmission portion 11, so a color repeatability deteriorates.

In the transflective liquid crystal display device in the related art, the light reflection portion 12 and the light transmission portion 11 are formed in the entire surface in parallel, so a formation region of the light transmission portion 11 becomes narrow for example when a formation region of the light reflection portion 12 is enlarged in considering that the reflective display is important. Therefore, an improvement both of luminance and visibility each in the light reflection portion 12 and the light transmission portion 11 is difficult.

In the above way, in the related art, a display in a color image at a high color purity and a high luminance by applying a superior color representability is also difficult each in the light reflection portion 12 and the light transmission portion 11. Specifically, in the light reflection portion 12 in which the light passes through the color filter layer 90 twice, the luminance is drastically lowered and the visibility deteriorates, so an image quality of the display image is_sometimes insufficient.

Various method have been proposed for realizing an improvement of the image quality each in the light reflection portion 12 and the light transmission portion 11 when the transflective liquid crystal display device is applied and displayed (for example, referred to Patent Document 1)

Patent Document 1: Japanese Unexamined Patent Application (Kokai) No. 2000-111902

DISCLOSURE OF THE INVENTION

Problem to be Solved by the Invention

FIG. 2 is a schematic view illustrating a configuration of a transflective liquid crystal display device proposed for realizing the improvement of the image quality each in the light reflection portion 12 and the light transmission portion 11 in the related art. In FIG. 2, FIG. 2(A) is a plane view illustrating a surface portion of a first substrate 10, in which the color filter layer formed on a second substrate 80 is expressed by a dot line, and FIG. 2(B) is a cross-sectional view illustrating a pixel portion of the liquid crystal display device along the line X1-X2 of FIG. 2(A).

The liquid crystal display device shown in FIG. 2 differs from the liquid crystal display device shown in FIG. 1 in that a region in the second substrate 80 facing a region where the light reflection portion 12 is formed has a region 92 in which a color filter layer 91 is formed at a predetermined layer thickness and a region 93 in which the color filter layer 91 is not formed. As a result, in the light reflection portion 12, a part of the front light L2 illuminated from the second substrate 80 side passes the color filter layer 91 only once or does not pass the same. And, a front light L2 passed through twice only the region 92 where the color filter layer 91 is formed at the predetermined layer thickness and a front light L2 passed at least once the region 93 where the color filter layer 91 is not performed are mixed and displayed, consequently, the luminance and the color purity are improved and the color repeatability is improved in the liquid crystal display device in the related art.

However, as shown in FIG. 2, a region of the second substrate 80 facing the region where the light reflection portion 12 is formed has a step difference (step) generated by the region 92 where the color filter layer 91 is formed and the region 93 where the color filter layer 91 is not formed, which allows the liquid crystal layer 10 to generate a difference of the layer thickness. As a result, the region in the second substrate 80 facing the region where the light reflection portion 12 is formed includes each region in which a retardation of the liquid crystal layer 19 is different, so a uniform display is difficult. Consequently, a contrast is reduced and the color repeatability deteriorates, which cause the deterioration of the image quality. Particularly, in a display in normally black mode, reflectance in a black display rises when a voltage is not applied to the liquid crystal layer 19, which decreases the contrast extremely.

As described above, it is difficult for the transflective liquid crystal display device in the related art to obtain a sufficient luminance and contrast in the color display, particularly in the reflective display, so the image quality is not sufficient. Consequently, an improvement of the image quality is demanded.

Therefore, an object according to the present invention is to provide a liquid crystal display device for obtaining a high luminance and a high contrast each in a reflective display and a transmissive display to realize a superior color repeatability and improve the image quality in a color display by a transflective liquid crystal display device, in which the reflective display and the transmissive display are jointly used, and a method for producing the same.

MEANS FOR SOLVING THE PROGRAM

To achieve the above object, according to the present invention, there is provided a liquid crystal display device having: a first substrate having a pixel portion formed with a light reflection portion and a light transmission portion; a second substrate separately arranged to face said first substrate and formed with a color filter layer so as to face a region formed with said light reflection portion and said light transmission portion; and a liquid crystal layer arranged between said first substrate and said second substrate, wherein a region of said second substrate facing a region formed with said light reflection portion includes a first region formed with said color filter layer at a predetermined layer thickness and a second region not formed with said color filer layer, and, in said first substrate, a layer thickness difference adjustment layer for adjusting a difference of a layer thickness of said liquid crystal layer generated by a height of step between said first region and said second region due to said color filter layer is formed in the region formed with said light reflection portion so as to face said second region.

According to the above liquid crystal display device of the present invention, a light illuminated to the light transmission portion passes through the color filter layer formed on the second substrate, while a light to be illuminated to the light reflection portion is illuminated from a second substrate side, passes through at least one of the first region where the color filter layer is formed at a predetermined layer thickness and a second region where the color filter is not formed is reflected at the light reflection portion in the first substrate, and passes through at least one of the first region and the second region in the second substrate again. Since the second region in the second substrate does not have the color filter layer, the light in the light reflection portion passed through the second region has a luminance higher than that of the light reflection portion passed through only the first region twice. And the light in the light reflection portion passed through the first region and the second region having the luminance higher than the first region is additively mixed and displayed, as a result, the reflective display is carried out at a luminance close to the transmissive display. The layer thickness difference adjustment layer formed in a formation region of the light reflection portion facing the second region decreases the difference of the layer thickness of the liquid crystal layer generated by the step between the first region and the second region due to the color filter layer, and reduces the difference of the retardation of the liquid crystal layer each in the first region and the second region. Consequently, a uniform display is obtained and a contrast con be improved.

To achieve the above object, according to the present invention, there is provided a liquid crystal display device having: a first substrate having a pixel portion formed with a light reflection portion and a light transmission portion; a second substrate separately arranged to face said first substrate and formed with a color filter layer so as to face a region formed with said light reflection portion and said light transmission portion; and a liquid crystal layer arranged between said first substrate and said second substrate, wherein said color filter layer has a first color filter layer formed in a region facing said light transmission portion at a predetermined color density and a second color filter layer formed in a region facing said light reflection portion at a approximately same layer thickness as said first color filter layer and formed at a color density lower than said first color filter layer.

According to the above liquid crystal display device of the present invention, the color filter layer on the second substrate has a first color filter layer formed at a predetermined color density in a region facing the light transmission portion and a second color filter layer formed in a region facing the light reflection portion at a color density lower than the first color filter layer and at the approximately same layer thickness as the first color filter layer. The light illuminated to the light transmission portion passes through the first color filter layer, while the light to be illuminated to the light reflection portion passes through the second color filter layer, is reflected at the light reflection portion, and passes through the second color filter layer again. The second color filter layer has the approximately same thickness as the first color filter layer and is formed at the color density lower than the first color filter layer, thereby the reflective display and the transmissive display are obtained at a similar luminance each other.

To achieve the above object, according to the present invention, there is provided a liquid crystal display device having: a first substrate having a pixel portion formed with a light reflection portion and a light, transmission portion; a second substrate separately arranged to face said first substrate and formed with a color filter layer so as to face a region formed with said light reflection portion and said light transmission portion; and a liquid crystal layer arranged between said first substrate and said second substrate, wherein a region of said second substrate facing a region formed with said light reflection portion includes a first region formed with said color filter layer at a predetermined layer thickness and a second region not formed with said color filer layer, and a flattening film having transparency and for flattening and reducing a height of step between said first region and said second region due to said color filter layer is formed in said second substrate.

According to the above liquid crystal display device of the present invention, the flatten film having transparency and for flattening and reducing the step between the first region and the second region due to the color filter layer is formed in the second substrate. Therefore, the difference of the layer thickness of the liquid crystal layer generated by the step of the color filter layer between the first region and the second region decreases, as a result, the difference of the retardation of the liquid crystal layer in the first region and the second region decreases. Consequently, the uniform display can be obtained and the contrast can be improved.

To achieve the above object, according to the present invention, there is provided a method for producing a liquid crystal display device including a first substrate having a pixel portion formed with a light reflection portion and a light transmission portion, a second substrate separately arranged to face said first substrate and formed with a color filter layer so as to face a region formed with said light reflection portion and said light transmission portion, and a liquid crystal layer arranged between said first substrate and said second substrate, in which a region of said second substrate facing a region formed with said light reflection portion includes a first region formed with said color filter layer at a predetermined layer thickness and a second region not formed with said color filer layer, the method having the step of: forming a layer thickness difference adjustment layer for adjusting a difference of a layer thickness of said liquid crystal layer generated by a step between said first region and second region due to said color filter layer in said light reflection portion of said first substrate so as to face said second region.

According to the above method for producing the liquid crystal display device of the present invention, the layer thickness difference adjustment layer for adjusting the difference of the layer thickness of the liquid crystal layer generated by the step between the first region and the second region due to the color filter layer is formed in the light reflection portion on the first substrate facing the second region. By forming the layer thickness difference adjustment layer in a formation region of the light reflection portion facing the second region, the difference of the layer thickness of the liquid crystal layer generated by the step between the first region and the second region due to the color filter layer decreases, as a result, the difference of the retardation of the liquid crystal layer between the first region and the second region decreases. Consequently, the uniform display can be obtained and the contrast can be improved.

To achieve the above object, according to the present invention, there is provided a method for producing a liquid crystal display device including a first substrate having a pixel portion formed with a light reflection portion and a light transmission portion, a second substrate separately arranged to face said first substrate and formed with a color filter layer so as to face a region formed with said light reflection portion and said light transmission portion, and a liquid crystal layer arranged between said first substrate and said second substrate, a step of forming said color filter layer having the steps of: forming a first color filter layer having a predetermined color density in a region facing said light transmission portion, and forming a second color filter layer having a color density lower than said first color filter layer in the region facing said light reflection portion so as to have an approximately same layer thickness as said first color filter layer.

According to the above method for producing the liquid crystal display device of the present invention, as the color filter layer, the first color filter layer having a predetermined color density is formed in a region facing the light transmission portion and the second color filter layer having a color density lower than the first color filter is also formed so as to have the approximately same layer thickness as the first color filter layer in a region facing the light reflection portion. Therefore, the light illuminated to the light transmission portion passes through the first color filter layer, while the light to be illuminated to the light reflection portion passes through the second color filter layer is reflected at the light reflection portion, and passes through the second color filter layer again. The second color filter layer has the approximately same thickness as the first color filter layer and is formed in the color density lower than the first color filter layer, so the reflective display and the transmissive display are obtained at similarly luminance.

To achieve the above object, according to the present invention, there is provided a method for producing a liquid crystal display device including a first substrate having a pixel portion formed with a light reflection portion and a light transmission portion, a second substrate separately arranged to face said first substrate and formed with a color filter layer so as to face a region formed with said light reflection portion and said light transmission portion, and a liquid crystal layer arranged between said first substrate and said second substrate, in which a region of said second substrate facing a region formed with said light reflection portion includes a first region where said color filter layer is formed at a predetermined layer thickness and a second region where said color filer layer is not formed, the method having the step of forming in said second substrate a flattening film having transparency and for flattening and reducing a height of step between said first region and said second region due to said color filter layer.

According to the above method for producing the liquid crystal display device of the present invention, the flattening film having transparency and for flattening and reducing the step between the first region and the second region due to the color filter layer is formed in the second substrate. As a result, the difference of the layer thickness of the liquid crystal layer generated by the step between the first region and the second region due to the color filter layer decreases, and the difference of the retardation of the liquid crystal layer between the first region and the second region decreases. Consequently, the uniform display can be obtained and the contrast can be improved.

EFFECT OF THE INVENTION

According to the present invention, it is possible to provide a liquid crystal display device obtaining a high luminance and a high contrast each in the reflective display and the transmissive display to realize a superior color repeatability and improve an image quality in a color display by a transflective liquid crystal display device in which the reflective display and the transmissive display are jointly used, and a method for producing the same.

BRIEF DESCRIPTION OF THE DRAWINGS

FIG. 1 is a schematic view illustrating a configuration of a transflective liquid crystal display device in the related art.

FIG. 4 is a cross-sectional view illustrating a section portion of the reflection portion of the liquid crystal display device of the first embodiment according to the present invention.

FIG. 8 is a cross-sectional view illustrating a section portion of a reflection portion of a liquid crystal display device of a second embodiment according to the present invention.

FIG. 10 is a cross-sectional view illustrating a section portion of the reflection portion of the liquid crystal display device according to the present invention.

LIST OF REFERENCES

10 . . . first substrate, 11 . . . light transmission portion, 12 . . . light reflection portion, 19 . . . liquid crystal layer, 20 . . . semiconductor device, 41, 43, 44, 45a, 45b, 46 . . . layer thickness adjustment layer, 80 . . . second substrate, 90, 91, 97 . . . color filter layer, 92 . . . first region, 93 . . . second region, 94 . . . flattening film, 95 . . . first color filter layer, 96 . . . second color filter layer.

BEST MODE FOR CARRYING OUT THE INVENTION

Below, preferred embodiments according to the present invention will be described in more detail with reference to the accompanying drawings.

First Embodiment

Figure 2:
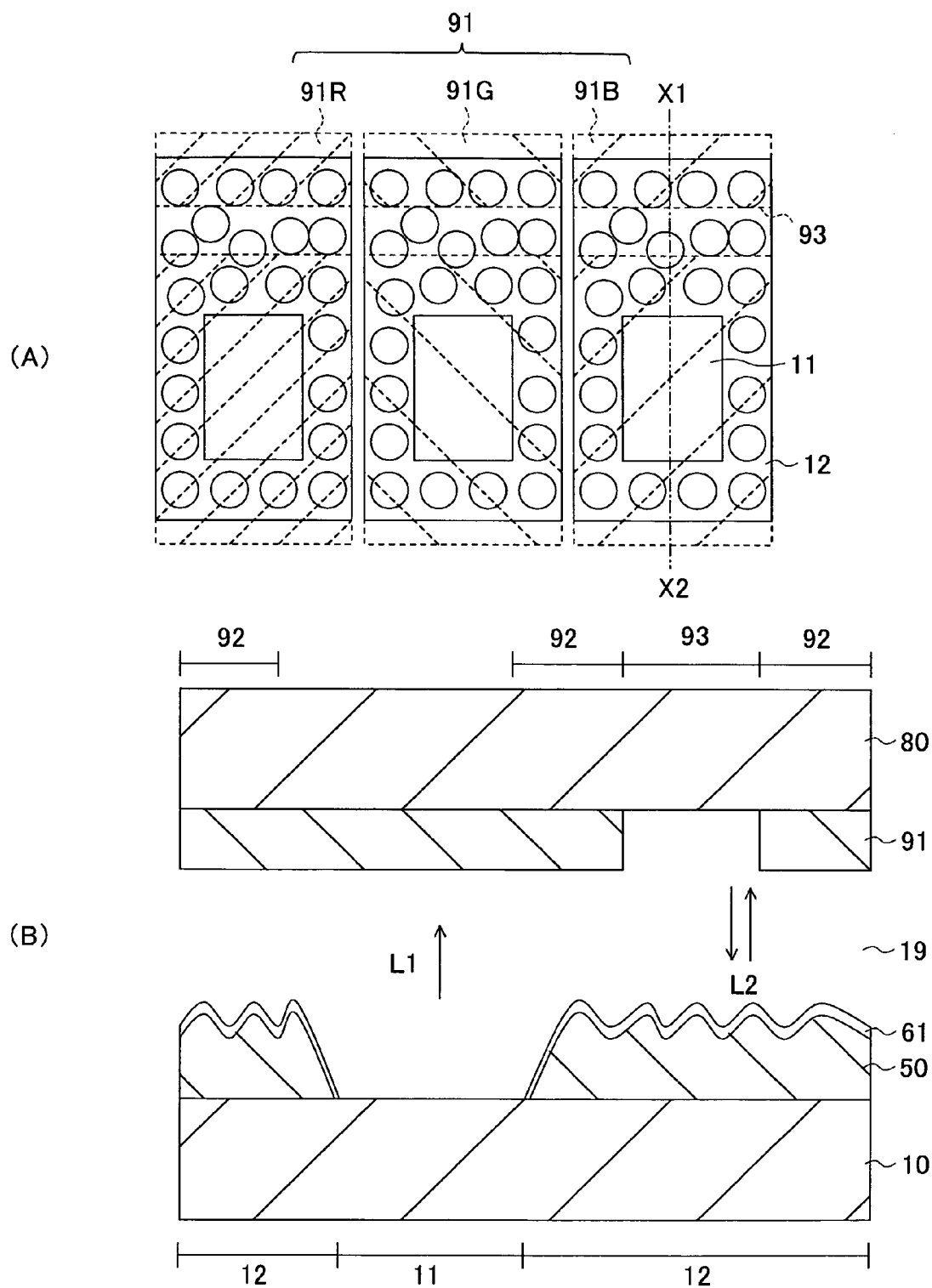
FIG. 2 is a schematic view illustrating a transflective liquid crystal display device proposed for realizing an improvement of an image quality each in a light reflection portion and a light transmission portion.
Figure 3:
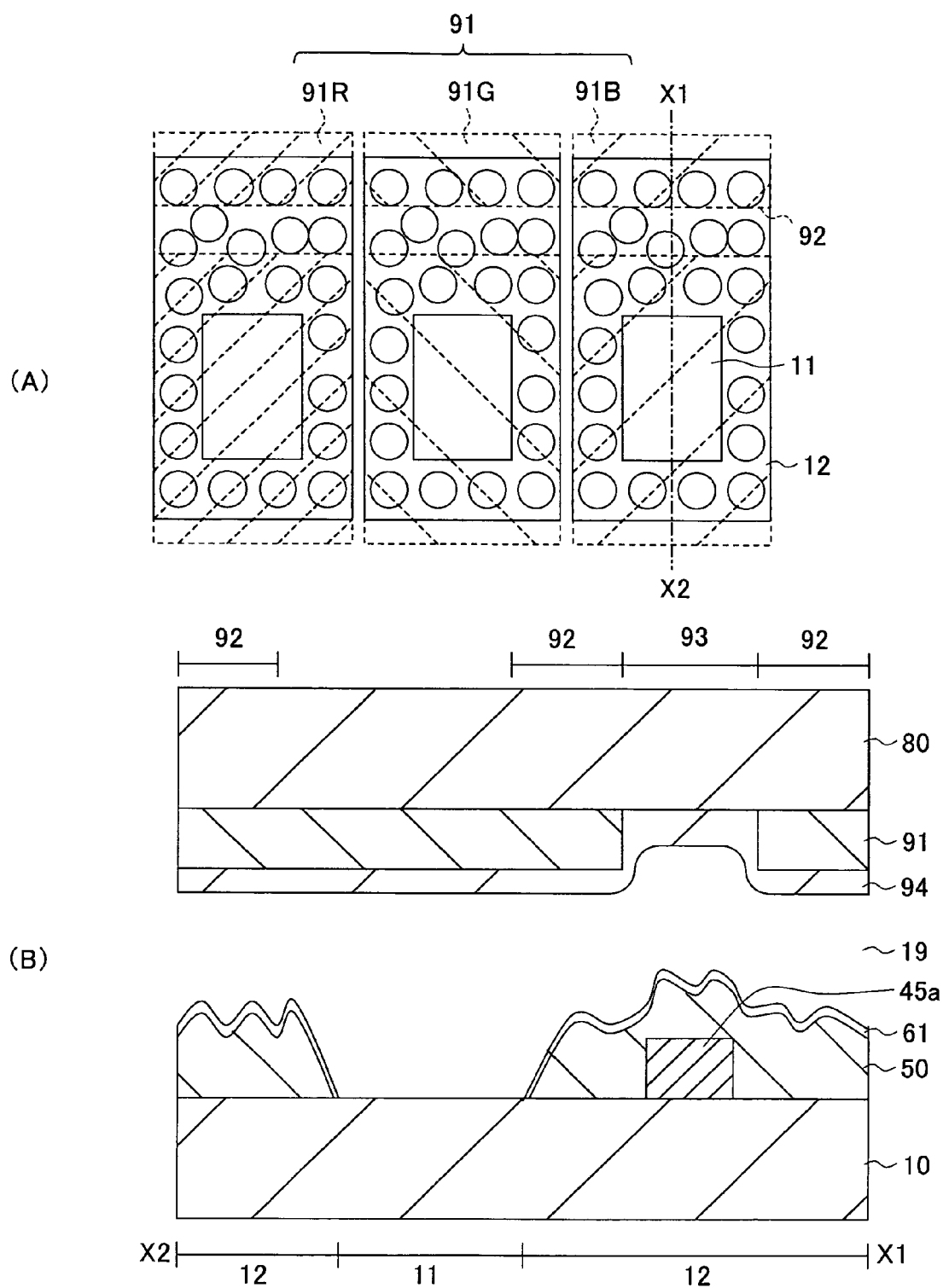
FIG. 3 is a schematic view illustrating a configuration of a liquid crystal display device of a first embodiment according to the present invention.

FIG. 3 is a schematic view illustrating a configuration of a liquid crystal display device according to the first embodiment. In FIG. 3, FIG. 3(A) is a plane view illustrating a surface portion of a first substrate 10, in which a color filter layer 91 formed on a second substrate 80 is expressed by a dot line, and FIG. 3(B) is a cross-sectional view illustrating a pixel portion of the liquid crystal display device along the line X1-X2 of FIG. 3(A), where a plurality of pixels is arranged in matrix.

As shown in FIG. 3, the liquid crystal display device of the present embodiment is provided with the first substrate 10, the second substrate 80, and a liquid crystal layer 19. The first substrate 10 is separately arranged to face the second substrate 80, and the liquid crystal layer 19 is arranged between the first substrate 10 and the second substrate 80.

Each of the first substrate 10 and the second substrate 80 has transparency and is formed for example by glass or other transparent material.

The liquid crystal layer 19 is sealed between the first substrate 10 and the second substrate 80, which are separated with a predetermined distance by a spacer. Each of the first substrate 10 and the second substrate 80 is provided with an alignment layer (not shown) for example formed by polyimide, and the liquid crystal layer 19 is arranged and aligned between the alignment layers. In the present embodiment, the liquid crystal layer 19 for example is twist nematic type for a normally black mode and mainly formed by liquid crystal material indicating a positive dielectric anisotropy.

The second substrate 80 is formed with the color filter layer 91 passing and coloring a front light and a back light. The color filter layer 91 is formed by polyimide resin containing pigments, dyes, or other colorants. The color filter layer 91 has a red color filter layer 91R, a green color filter layer 91B, and a blue color filter layer 91B of the primary colors as a set. In a region facing the light transmission portion 11, the respective color filter layers 91 are formed in thickness of 1 μm to overlap each other in the entire region. While, in a region in the second substrate 80 facing a formation region of the light reflection portion 12, a first region 92 where the color filter layer 91 is formed in thickness of 1 μm and a second region 93 where the color filter layer 91 is not formed are formed, and the first region 92 and the second region 93 form a step difference (step). In the present embodiment, the second region 93 where the color filter layer 91 is not formed is formed in a slit shape in width of 28 μm.

In the second substrate 80, a flattening film 94 having transparency and for flattening and reducing the step between the first region 92 and the second region 93 due to the color filter layer 91 so as to reduce the step. In the present embodiment, the flattening film 94 is formed in thickness of 2.5 μm in a region facing the light transmission region 11 and a first region 92 of the light reflection region 12 and formed in thickness of 2.0 μm in a region facing the second region 93 of the light reflection portion 12. The step between the first region 92 and the second region 93 is 1.0 μm before forming the flattening film 94, while the step is 0.5 μm after forming the flatting film 94. In this way, the step between the first region 92 and the second region 93 is reduced.

Also, in the second substrate 80, ITO of a common electrode (not shown) is formed on the flattening film 94.

On the other hand, the light transmission portion 11 and the light reflection portion 12 are formed in parallel in a single pixel portion of the first substrate 10, and the reflective display and the transmissive display can be jointly used as transflective type.

The light transmission portion 11 of the first substrate 10 is a portion passing a light illuminated from a backlight (not shown), where ITO or other transparent substrate (not shown) is formed.

FIG. 4 is a cross-sectional view illustrating a section portion of the reflection portion 12 in the liquid crystal display device of the present embodiment shown in FIG. 3.

The light reflection portion 12 of the first substrate 10 is a portion for reflecting an ambient light, and reflects at a pixel electrode 61 a front light illuminated from a second substrate 80 side through the liquid crystal layer 19.

As shown in FIG. 4, in the reflection portion 12 of the first substrate 10, a TFT of a semiconductor element 20 is formed as a switching element connected to a pixel electrode including a transparent electrode in the light transmission portion 11 and a reflection electrode 61 in the light reflection portion 12. The TFT of the semiconductor element 20 is formed in a bottom gate structure and provided with a gate electrode 21, a gate insulation film 22, a semiconductor layer 23, and a channel stopper layer 24 as an element formation layer for forming the semiconductor element 20 in the present embodiment. The gate electrode 21 is formed for example by molybdenum. The gate insulation film 22 is formed by a stacked layer of a silicon nitride film and a silicon oxidation film. The semiconductor layer 23 is formed for example by polysilicon and has a channel formation region formed in a region facing the gate electrode 21, and a pair of impurity diffusion regions formed and sandwiched between the channel regions and functioning as a source and a drain. And the channel stopper layer 24 is formed of a silicon oxide film. Further, a source electrode 25S and a drain electrode 25D are formed by aluminum as electrodes for connecting the TFT of the semiconductor element 20 and the pixel electrode. Illustrations are omitted in FIG. 4, a scanning line (not shown) connected to the gate electrode 21 of TFT and a signal line (not shown) connected to the source electrode 25D of TFT are crossed and formed. The drain electrode 25D is connected to the pixel electrode of the pixel portion.

In the light reflection portion 12 of the first substrate 10, a layer thickness difference adjustment layer 45a is formed so as to facing the second region 93 where the color filter layer 91 is not formed. The layer thickness difference adjustment layer is formed in thickness of about 1 μm to adjust and reduce a difference of a layer thickness of the liquid crystal layer generated by the step between the first region 92 and the second region 93 due to the color filter layer 91. In the present embodiment, by forming the flattening film 94 in the second substrate 80, the step between the first region 92 and the second region 93 due to the color filter layer 91 decreases, and the step of about 0.5 μm remains. So the layer thickness different adjustment layer 45a rises a height of a part of a surface portion of the reflection portion 61 to adjust a distance between the first substrate 10 and the second substrate 80, thereby the layer thickness of the liquid crystal layer 19 is adjusted to the same thickness in the first region 92 and the second region 93.

Note that, in the present embodiment, the layer thickness difference adjustment layer 45a is formed by the same process for forming the source electrode 25S and the drain electrode 25D of the connection electrode connected to the TFT of the semiconductor element 20. Here, when aluminum of a connection electrode formation layer for forming the source electrode 25S and the drain electrode 25D is deposited in a region for forming the source electrode 25S and the drain electrode 25D, the aluminum is also deposited in a region for forming the layer thickness difference adjustment layer 45a in the same way. Then, when the connection electrode formation layer deposited in the region for forming the source electrode 25S and the drain electrode 25D is patterned in a predetermined shape, the connection electrode formation layer deposited in the region for forming the layer thickness difference adjustment layer 45a is patterned in a predetermined shape. In this way, the layer thickness difference adjustment layer 45a in the present embodiment is formed.

And, in the light reflection portion 12, a relief surface layer 50 is formed on the first substrate 10. The relief surface layer 50 is preferably formed in irregular relief shape because of regular relief shape causing light interference to generate coloring-up (color contamination). The relief surface layer 50 is formed on the first substrate 10 in a column bumpy shape and has a relief underlying layer 51 of a relief shaped underlayer and a relief overlying layer 52 of a relief shaped overlayer filling up a recess of the relief underlying layer 51.

The reflection electrode 61 is provided to cover the relief surface layer 50. The reflection electrode is formed by metal film of for example rhodium, titanium, chrome, silver, aluminum, or chromel. In the present embodiment, silver having high reflectance is applied. The transparent electrode of the light transmission portion 11 and the reflection electrode 61 of the light reflection portion 12 form a pixel electrode in the pixel portion.

A retardation film and a polarizing film are successively provided and a backlight supplying the back light is also provided through the retardation film and the polarizing film at a surface side of the first substrate 10 opposed to another surface side where the liquid crystal layer 19 is arranged. And, a counter electrode of ITO is formed in the second substrate 80 to face the pixel electrode. A retardation film and a polarizing film are successively provided at a surface side of the second substrate 80 opposed to another surface side where the liquid crystal layer 19 is arranged.

Figure 5:
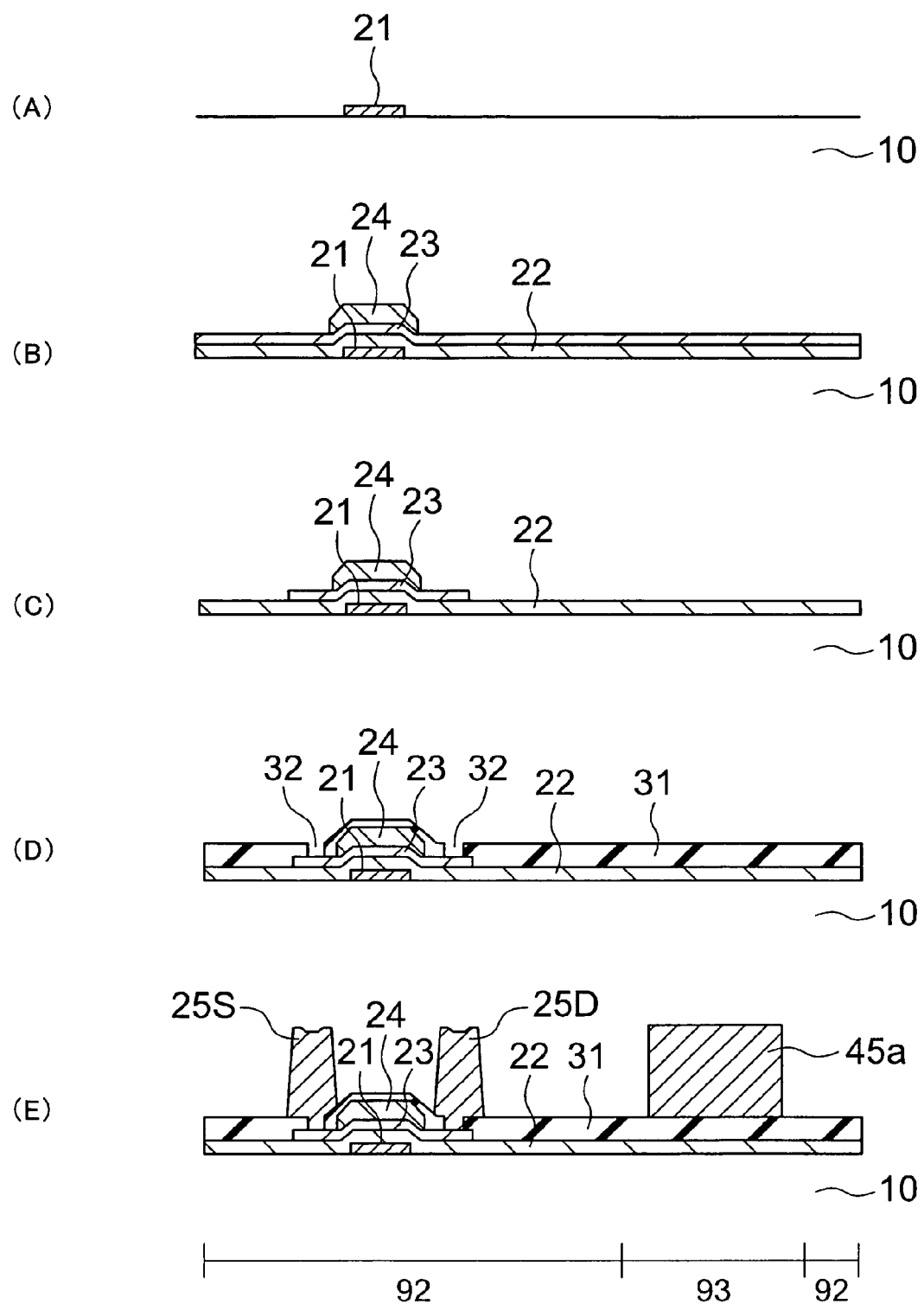
FIG. 5 is a cross-sectional view for illustrating a production step of the reflection portion in a first substrate in a method for producing the liquid crystal display device of the first embodiment according to the present invention.
Figure 6:
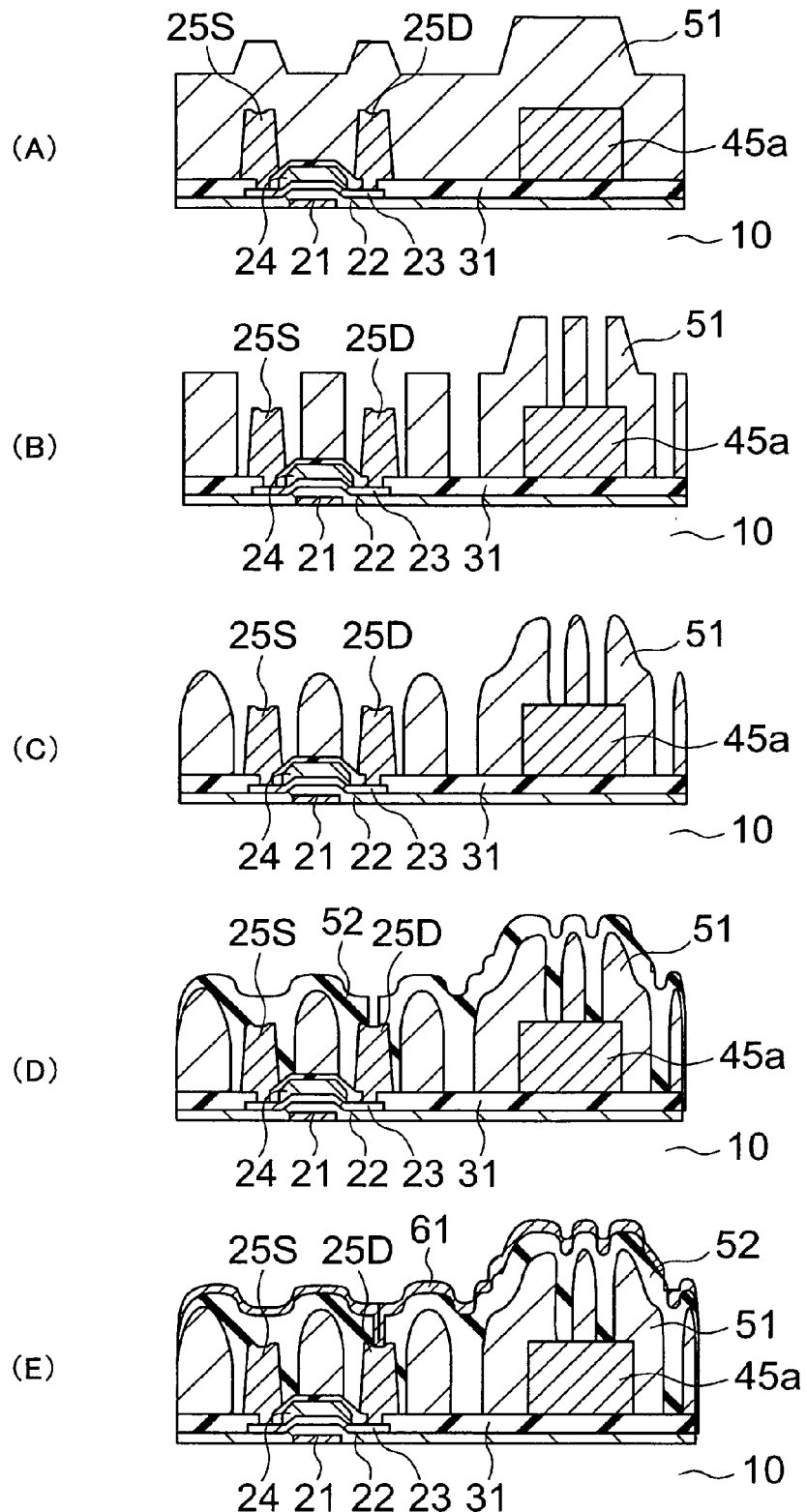
FIG. 6 is a cross-sectional view for illustrating the following step of the reflection portion in a first substrate in the method for producing the liquid crystal display device of the first embodiment according to the present invention.

Next, a method for producing the liquid crystal display device of the present embodiment will be described. FIG. 5 and FIG. 6 are cross-sectional views illustrating a production step in the light reflection portion 12 of the first substrate 10 in the method for producing the liquid crystal display device of the present embodiment.

As shown in FIG. 5(A), molybdenum of a conductive material is deposited on the first substrate 10, and patterned in a predetermined shape by photolithography to form the gate electrode 21.

As shown in FIG. 5(B), a silicon nitride film and a silicon oxide film are deposited on the entire surface to cover the gate electrode 21 to thereby form the gate insulation film 22. Then, a semiconductor layer 23 of amorphous silicon is deposited on the gate insulation film. A silicon oxide film is deposited to cover the semiconductor layer 23. The silicon oxide film is patterned and remains in a channel formation region of the semiconductor layer 23 to form a channel stopper layer 24.

As shown in FIG. (C), the semiconductor layer 23 is patterned by photolithography in a predetermined shape, thermally treated at a predetermined temperature to convert amorphous silicon of the semiconductor layer 23 to polysilicon. Then, impurities are doped in self-alignment into the region to be a source and a drain in the semiconductor layer 23 to form a bottom gate structure TFT.

As shown in FIG. 5(D), a silicon oxidation film is deposited to cover TFT to thereby form an interlayer insulation film 31. Then, contact holes are formed in the interlayer insulation film 31 by photolithography to expose surface portions of a source region and a drain region of TFT.

As shown in FIG. 5(E), the source electrode 25S of the connection electrode connected to the source of TFT, the drain electrode 25d of the connection electrode connected to the drain of TFT, and the layer thickness difference adjustment layer 45a are formed. Here, while aluminum of a connection electrode formation layer for forming the source electrode 25S and the drain electrode 25D is deposited in a region for forming the source electrode 25S and the drain electrode 25D, the aluminum is also deposited in a region for forming the layer thickness difference adjustment layer 45a in the same way. Then, while the aluminum of the connection electrode formation layer deposited in the region for forming the source electrode 25S and the drain electrode 25D is patterned in a predetermined shape, the aluminum of the connection electrode formation layer deposited in the region for forming the layer thickness difference adjustment layer 45a is also patterned in a predetermined shape in the same way. In this way, the layer thickness difference adjustment layer 45a in the present embodiment is formed in the light reflection portion 12 of the first substrate 10 so as to face the second region 93.

As shown in FIG. 6(A), the relief underlying layer 51 of photo sensitive material is formed on the entire surface at a predetermined thickness in a region for forming the light reflection portion 12 of the first substrate 10 to cover TFT and the layer thickness difference adjustment layer 45a.

As shown in FIG. 6(B), the relief underlying layer 51 is patterned in bumpy shape to form randomly unevenness distribution shape on the first substrate 10.

As shown in FIG. 6(C), the relief underlying layer 51 is thermally treated to transform a surface shape thereof patterned in the bumpy shape to thereby form a curved surface.

As shown in FIG. 6(D), the relief overlying layer 52 of photo sensitive material is formed on the entire surface in a predetermined thickness to cover the surface of the first substrate 10 formed with the relief underlying layer 51. In this way, the relief underlying layer 51 and the relief overlying layer 52 are formed to thereby form the relief shape layer 50. Then, a contact hole is formed to expose a surface portion of the drain electrode 25D.

As shown in FIG. 6(E), silver is deposited on the relief shape layer 50 to fill up the contact hole and patterned to form the reflection electrode 61.

After that, as shown in FIG. 3, an ITO film is deposited and patterned in the light transmission portion 11 of the first substrate 10 to form a transparent electrode (not shown). Here, the transparent electrode of the light transmission portion 12 and the reflection electrode 61 of the light reflection portion 12 are formed as the pixel electrode so as to connect each other.

On the other hand, in the second substrate 80, the color filter layer 91 is formed as shown in FIG. 3. Polyimide or other resin containing pigments or dyes based on a primary color of the color filter 91 is formed in the second substrate 80 in thickness of 1 μm. The resin is patterned so that a region in the second substrate 80 facing the region where the light reflection portion 11 is formed may include the first region 92 where the color filter layer 91 is formed in thickness of 1 μm and the second region 93 where the color filter layer 91 is not formed, thereby the color filter layer 91 in the respective primary colors is formed. In the present embodiment, the second region 93 is patterned in slit width of 28 μm.

The flattening film 94 having transparency and for flattening and reducing the step between the first region 92 and the second region 93 due to the color filter, is formed. Then, ITO is deposited and patterned in a predetermined shape to form a counter electrode (not shown) in a region in the second substrate facing the pixel electrode of the first substrate 10.

An alignment film (not shown) is formed and aligned each in the first substrate where the pixel electrode is formed and the second substrate 80 where the counter electrode is formed. The first substrate 10 and the second substrate 80 are provided therebetween with a spacer, bonded by seal adhesive, injected therebetween with a liquid crystal of the liquid crystal layer 19, and sealed to form a liquid crystal panel.

A retardation film, a polarization plate, a backlight, and a drive circuit are for example arranged to produce the liquid crystal display device.

In the present embodiment, a back light illuminated from a surface side of the first substrate opposed to another surface side where the liquid crystal layer 19 is arranged passes through the light transmission portion 11 of the first substrate 10 and also passes through the color filter layer 91 formed in the second substrate 80. While a front light illuminated from the second substrate 80 side via the liquid crystal layer 19 passes through at lease one of the first region 92 where the color filter layer 91 is formed at the predetermined thickness and the second region 93 where the color filter layer 91 is not formed, is reflected at the light reflection portion 12 of the first substrate 10, and passes through at least one of the first region 92 and the second region 93 in the second substrate 80 again. The color filter layer 91 is not formed in the second region 93 of the second substrate 80, so the light in the light reflection portion 12 passed through the second region 93 has a luminance higher than the light reflection portion 12 passed through the only first region 92 twice. The light passed through the first region 92 and the second region 93 passing a light at the luminance higher than the first region 92 are additively mixed and displayed, so the reflective display is carried out at the luminance close to the transmissive display.

In the present embodiment, the layer thickness difference adjustment layer 45a formed in a formation region of the light reflection portion 12 facing the second region 93 decreases a difference of the layer thickness of the liquid crystal layer 19 generated by the step between the first region 92 and the second region 93 due to the color filter layer 91, and reduces the difference of the retardation of the liquid crystal layer between the first region 92 and the second region 93, so the uniform display can be obtained and the contrast can be improved.

Figure 7:
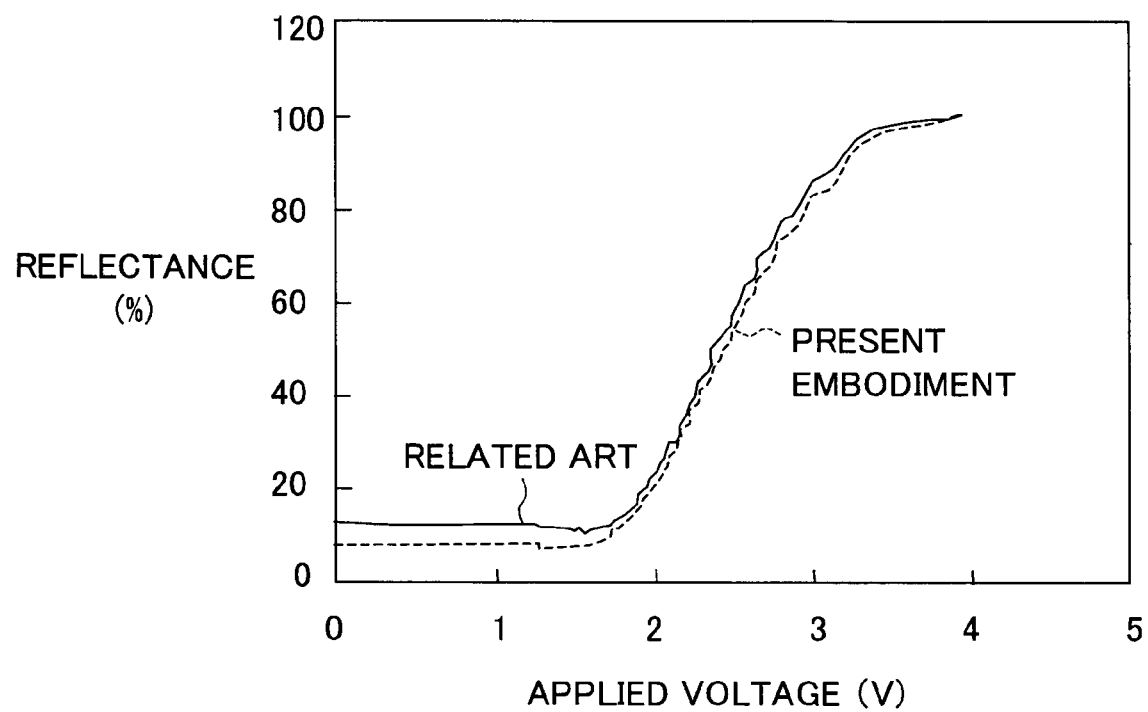
FIG. 7 is a view illustrating a measured result of reflectance in various voltage in a normally block mode in the liquid crystal display device of the first embodiment according to the present invention.

FIG. 7 is a view illustrating a measured result of reflectance in various voltage in normally black mode which affects the layer thickness of the liquid crystal layer 19, in the liquid crystal display device of the present embodiment. Note that, a liquid crystal display device, where the layer thickness difference adjustment layer 45*a* is not formed, compared with the liquid crystal display device of the present embodiment is expressed as the related art in FIG. 7. As shown in FIG. 7, in the liquid crystal display device of the present embodiment, the reflectance is lower than that of the related art, and while the contrast of the related art is about 8, the contrast of the present embodiment is about 12, which is improved.

In the present embodiment, the flattening film 94 having transparency and for flattening and reducing the step between the first region 92 and the second region 93 due to the color filter layer 91 is formed in the second substrate 80. The formation of the flattening film 94 reduces the step between the first region 92 and the second region 93 due to the color filter layer 91. Therefore, an jointly application of the layer thickness difference adjustment layer 45*a* decreases the difference of the layer thickness of the liquid crystal layer 19 generated by the step between the first region 92 and the second region 93 due to the color filter layer 91, and reduces the difference of the retardation of the liquid crystal layer between the first region 92 and the second region 93, so the uniform display can be obtained and the contrast can be improved.

In the present embodiment, the layer thickness difference adjustment layer 45*a* is formed by the same process for forming the source electrode 25S and the drain electrode 25D of the connection electrode connected to TFT of the semiconductor element 20. When aluminum of a connection electrode formation layer for forming the source electrode 25S and the drain electrode 25D is deposited in a region for forming the source electrode 25S and the drain electrode 25D, the aluminum is also deposited in a region for forming the layer thickness difference adjustment layer 45*a* in the same way. Then, when the connection electrode formation layer deposited in the region for forming the source electrode 25S and the drain electrode 25D is patterned in a predetermined shape, the connection electrode formation layer deposited in the region for forming the layer thickness difference adjustment layer 45*a* is patterned in a predetermined shape in the same way. In this way, the layer thickness difference adjustment layer 45*a* in the present embodiment is formed. Therefore, according to the present embodiment, a production thereof can be performed in high production efficiency.

Therefore, according to the present embodiment, a high luminance and a high contrast can be obtained each in the reflective display and the transmissive display to realize a superior color repeatability and improve an image quality in a color display by the transflective liquid crystal display device in which the reflective display and the transmissive display are jointly used.

Second Embodiment

FIG. 8 is a cross-sectional view illustrating a sectional portion of the reflection portion in a liquid crystal display device in the second embodiment. Except for forming a plurality of the layer thickness difference adjustment layers in the reflection portion 12, the liquid crystal display device in the present embodiment is the same as the transflective liquid crystal display device in the first embodiment shown in FIG. 3. Therefore, explanations of similarly portions are omitted.

As shown in FIG. 8, in the liquid crystal display device of the present embodiment, each of a first layer thickness difference adjustment layer 41, a second layer thickness difference adjustment layer 43, a third layer thickness difference adjustment layer 44, and a fourth layer thickness difference adjustment layer 45*b* is formed as the layer thickness difference adjustment layer so as to face the second region 93 where the color filter layer 91 is not formed in the light reflection portion 12 of the first substrate 10. The layer thickness difference adjustment layers 41, 43, 44, 45*b* are, in the same way as the first embodiment, formed in the entire thickness of about 1 μm in order that each of them adjusts and reduces the difference of the layer thickness of the liquid crystal layer 19 generated by the step between the first region 92 and the second region 93 due to the color filter layer 91. Therefore, the layer thickness difference adjustment layers 41, 43, 44, 45*b* raise a height of a part of the surface portion of the reflection portion 61 and adjust a distance between the first substrate 10 and the second substrate 80 to thereby adjust the layer thickness of the liquid crystal layer 19 so as to have the same in the first region 92 and the second region 93.

In the present embodiment, each of the layer thickness difference adjustment layers 41, 43, 44, 45*b* is formed by the same process for forming TFT of the semiconductor element 20 connected to the pixel electrode formed in the pixel portion and for forming the source electrode 25S and the drain electrode 25D of the connection electrode connected to the TFT of the semiconductor element 20. For example, when molybdenum of an element formation layer for forming the gate electrode 21 of TFT is deposited in a region for forming the gate electrode 21, the molybdenum of the element formation layer is also deposited in the same way in a region for forming the first layer thickness difference adjustment layer 41. Then, when the element formation layer deposited in the region for forming the gate electrode 21 is patterned in a predetermined shape, the element formation layer deposited in the region for forming the first layer thickness difference adjustment layer 41 is patterned in a predetermined shape. In this way, the first layer thickness difference adjustment layer 41 is formed in the present embodiment. Further, the second layer thickness difference adjustment layer 43 is formed in the same way as the process for forming the semiconductor layer 23 of the TFT, the third layer thickness difference adjustment layer 44 is formed in the same way as the process for forming the channel stopper layer 24 of TFT, and the fourth layer thickness difference adjustment layer 45*b* is formed in the same way as the process for forming the source electrode 25S and the drain electrode 25D in the semiconductor layer 23 of the TFT, which is the same way as the layer thickness difference adjustment layer 45*a* in the first embodiment.

Figure 9:
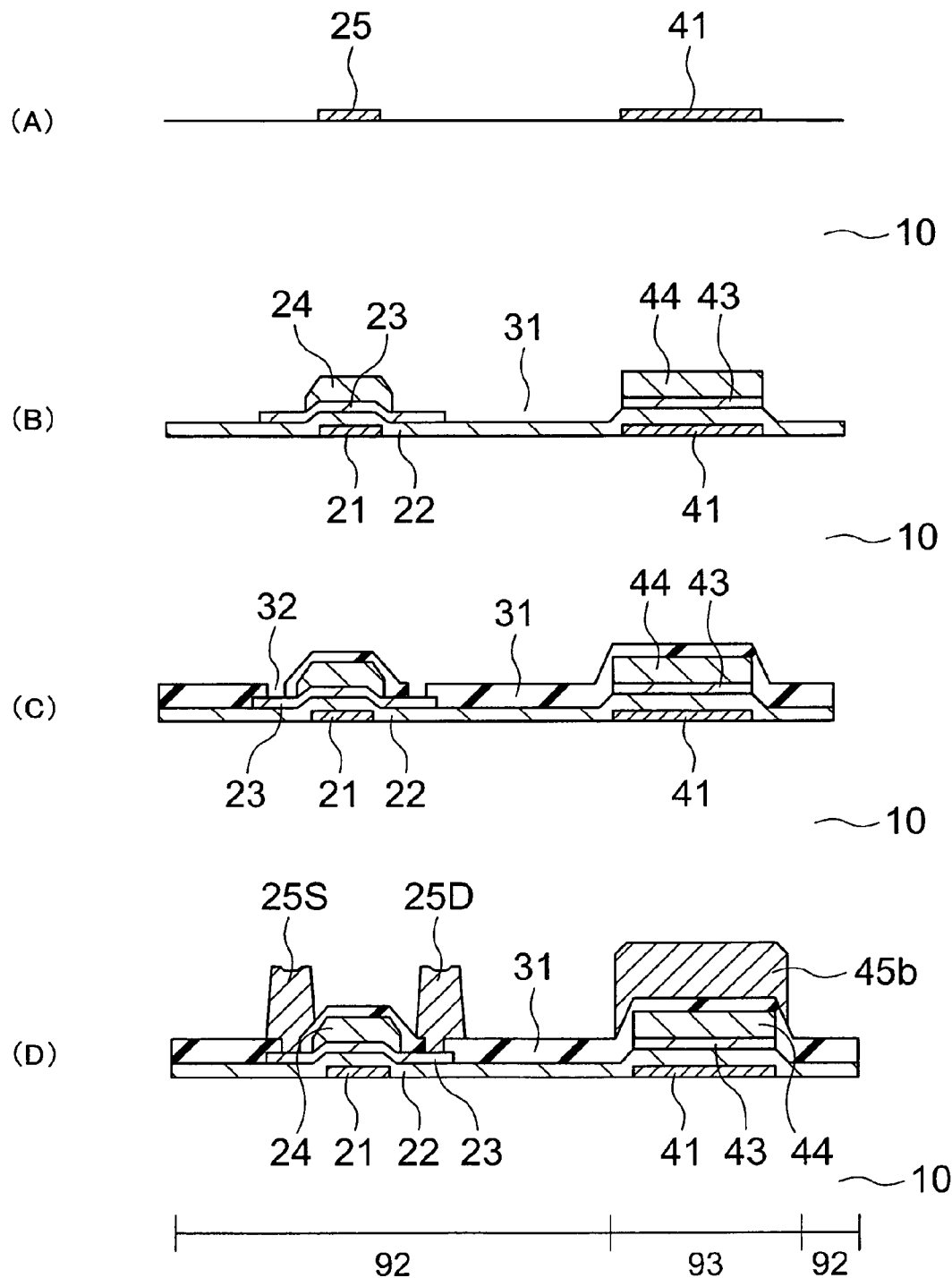
FIG. 9 is a cross-sectional view for illustrating a production step of the reflection portion in a method for producing the liquid crystal display device of the second embodiment according to the present invention.

Next, a method for producing the liquid crystal display device according to the present embodiment will be described. FIG. 9 is a cross-sectional view illustrating a production step in the light reflection portion 12 of the first substrate 10 in the method for producing the liquid crystal display device in the present embodiment.

As shown in FIG. 9(A), molybdenum of conductive material for forming the gate electrode 21 is deposited in a region for forming the gate electrode 21 of the first substrate 10 and a region for forming the first layer thickness difference adjustment layer 41. Then, the molybdenum is patterned in a predetermined shape by photolithography to form the gate electrode 21 and the first layer thickness difference adjustment layer 41, which faces the second region 93 of the second substrate 80 where the color filter layer 91 is not formed. Note that, each of the second layer thickness difference adjustment layer 43, the third layer thickness difference adjustment layer 44, the fourth layer thickness difference adjustment layer 45b in a later description is formed in the same way as the first layer thickness difference adjustment layer 41 so as to face the second region 93 of the second substrate 80 where the color filter layer 91 is not formed.

As shown in FIG. 9(B), a silicon nitride film and a silicon oxide film are deposited to cover the gate electrode 21 to thereby form the gate insulation film 22 on the entire surface. Then, the semiconductor layer 23 of amorphous silicon is deposited on the gate insulation film 22. Similarly, the layer 23 is also deposited in a region for forming the second layer thickness difference adjustment layer 43. Then, a silicon oxide film is deposited to cover the semiconductor layer 23, and patterned and remains in the channel formation region of the semiconductor layer 23 to thereby form the channel stopper layer 24. At the same time, in the same way as patterning of the channel stopper layer 24, the silicon oxide film in the region for forming the second layer thickness difference adjustment layer 43 is also patterned to form the second layer thickness difference adjustment layer 43. Then, in the same way as patterning of the semiconductor layer 23 having the channel formation region, the semiconductor layer 23 in a region for forming the third layer thickness difference adjustment layer 44 is patterned in a predetermined shape by photolithography to form the third layer thickness difference adjustment layer 44 on the second layer thickness difference adjustment layer 43. Then, the semiconductor layer 23 of amorphous silicon is thermally treated at a predetermined temperature to convert amorphous silicon to polysilicon. Then, impurities are doped in self-alignment into the semiconductor layer 23 in a region for forming the source and drain to thereby form a bottom gate structure TFT.

As shown in FIG. 9(C), a silicon oxide film is deposited to cover the TFT and the third layer thickness difference adjustment layer 44 to thereby form an interlayer insulation film 31. Then, contact holes are formed in the interlayer insulation film 31 by photolithography to expose the source and drain of the TFT.

As shown in FIG. 9(D), the source electrode 25S of the connection electrode connected to the source of TFT, the drain electrode 25D of the connection electrode connected to the drain of TFT, and the fourth layer thickness difference adjustment layer 45b are formed by aluminum. Specifically, while aluminum of the connection electrode formation layer for forming the source electrode 25S and the drain electrode 25D is deposited in the region for forming the source electrode 25S and the drain electrode 25D, the aluminum of the connection electrode formation layer is deposited in the region for forming the fourth layer thickness difference adjustment layer 45b in the same way. And, while the aluminum of the connection electrode formation layer deposited in the region for forming the source electrode 25S and the drain electrode 25D is patterned in a predetermined shape, the aluminum of the connection electrode formation layer deposited in the region for forming the fourth layer thickness difference adjustment layer 45b is patterned in a predetermined shape, thereby the fourth layer thickness difference adjustment layer 45b is formed on the third layer thickness difference adjustment layer 44.

Then, in the same way as the first embodiment, the relief shape layer 50 having the relief underlying layer 51 and the relief overlying layer 52, and the reflection electrode 61 are formed in a region for forming the light reflection portion 12 of the first substrate 10. Then, an ITO film is deposited and patterned in the light transmission portion 11 of the first substrate 10 to form a transparent electrode (not shown).

In the same way as the first embodiment, the color filter layer 91 and the flattening film 94 are formed in the second substrate 80. An alignment layer (not shown) is provided and aligned each in the first substrate 10 and the second substrate 80, and then two substrates are bonded, injected therebetween with liquid crystal as the liquid crystal layer 19, and sealed to form a liquid crystal panel.

The retardation film, the polarizing plate, the backlight, and the drive circuit are arranged to produce the liquid crystal display device.

In the present embodiment, in the same way as the first embodiment, the light illuminated to the light reflection portion 12 is additively mixed and displayed in the first region 92 and the second region 93 of the second substrate 80, so the reflective display is carried out at the luminance close to the transmissive display. Each of the layer thickness difference adjustment layers 41, 43, 44, 45b formed in the formation region of the light reflection portion 12 facing the second region 93 decreases the difference of the layer thickness of the liquid crystal layer 19 generated by the step between the first region 92 and the second region 93 due to the color filter layer 91 and reduces the difference of the retardation of the liquid crystal layer between the first region 92 and the second region 93, so the uniform display can be obtained and the contrast can be improved.

In the present embodiment, each of the layer thickness difference adjustment layers 41, 43, 44, 45b is formed in the same step as the step for forming TFT of the semiconductor element 20 connected to the pixel electrode formed in the pixel portion or for forming the source electrode 25S and the drain electrode 25D of the connection electrode connected to TFT. Therefore, the production can be performed in high production efficiency in the present embodiment.

Therefore, according to the present embodiment, a high luminance and a high contrast can be obtained each in the reflective display and the transmissive display to realize a superior color repeatability and improve an image quality in a color display by the transflective liquid crystal display device in which the reflective display and the transmissive display are jointly used. And according to the present embodiment, a production thereof can be performed in high production efficiency.

Third Embodiment

FIG. 10 is a cross-sectional view illustrating a section portion of the reflection portion 12 in a liquid crystal display device in the third embodiment. Except for forming a layer thickness difference adjustment layer of photosensitivity resin in the reflection portion 12, the liquid crystal display device in the present embodiment is the same as the transflective liquid crystal display device in the first embodiment shown in FIG. 3. Therefore, explanations of similarly portions are omitted.

As shown in FIG. 10, in the liquid crystal display device of the present embodiment, a layer thickness difference adjustment layer 46 of photosensitive resin is formed so as to face the second region 93 where the color filter layer 91 is not formed in the light reflection portion 12 of the first substrate 10. The layer thickness difference adjustment layer 46, in the same way as the first embodiment, is formed in about 1 µm in order to adjust and reduce the difference of the layer thickness of the liquid crystal layer 19 generated by the step between the first region 92 and the second region 93 due to the color filter layer 91, and raises a height of a part of the surface portion of the reflection portion 61 to adjust a distance between the first substrate 10 and the second substrate 80 to thereby adjust the layer thickness of the liquid crystal layer 19 so as to have the same in the first region 92 and the second region 93.

Figure 11:
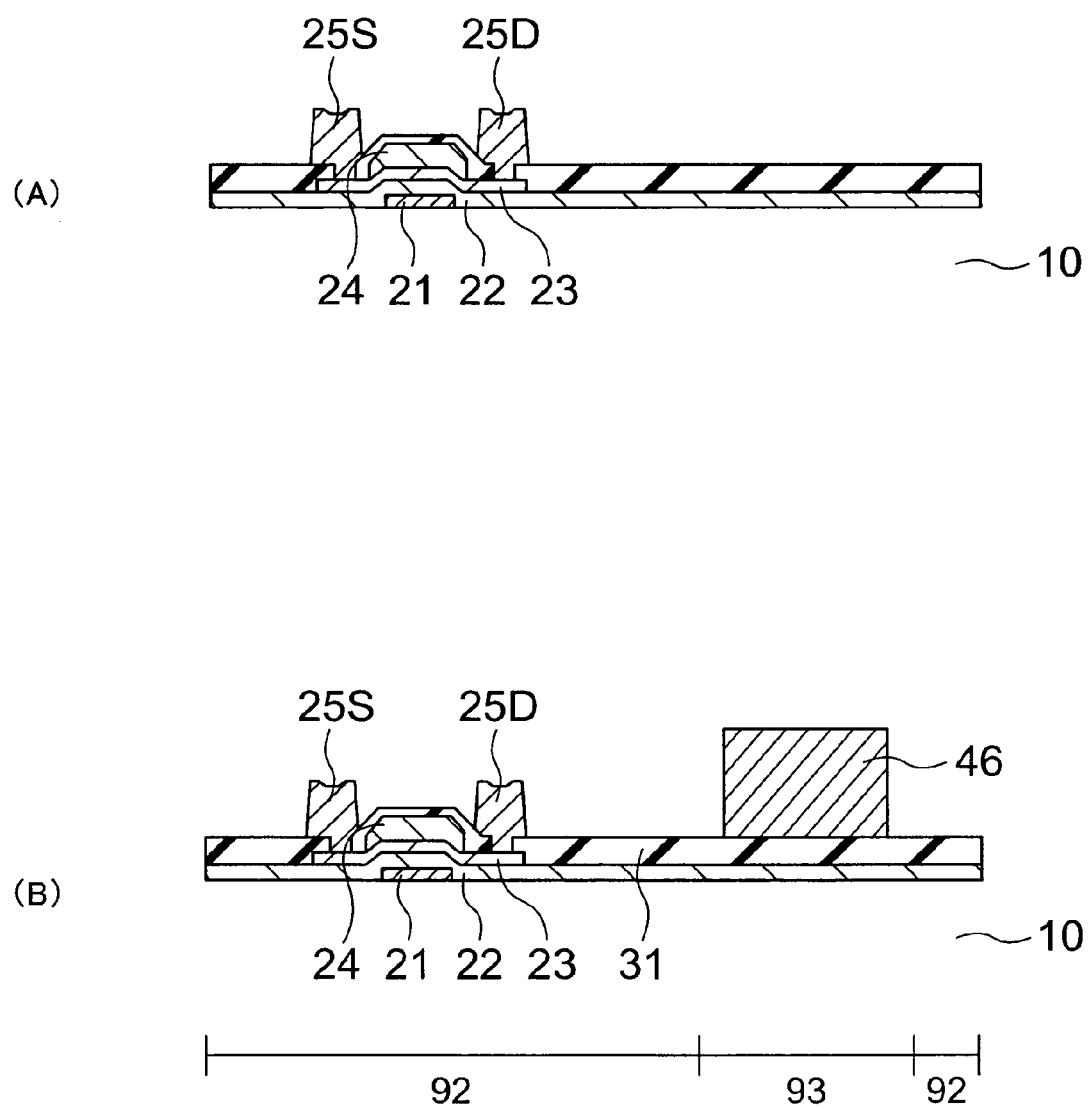
FIG. 11 is a cross-sectional view for illustrating a production step of the light reflection portion in the first substrate in the method for producing the liquid crystal display device of the second embodiment according to the present invention.

Next, a method for producing the liquid crystal display device according to the present embodiment will be described. FIG. 11 is a cross-sectional view illustrating a production step in the light reflection portion 12 of the first substrate 10 in the method for producing the liquid crystal display device in the present embodiment.

In the present embodiment, TFT is formed in the same way as the steps up to FIG. 5(D) in the first embodiment, a silicon oxide film is deposited to cover TFT to thereby form the interlayer insulation film 31. Then, contact holes are formed in the interlayer insulation film 31 by photolithography to expose the source and drain of TFT.

As shown in FIG. 11(A), the source electrode 25S of the connection electrode connected to the source of TFT and the drain electrode 25D of the connection electrode connected to the drain of TFT are formed by aluminum in the same way as the first embodiment.

As shown in FIG. 11(B), a photosensitive resin layer is formed in a predetermined thickness in the entire surface of the first substrate 10, and the layer thickness difference adjustment layer 46 is formed by photolithography so as to face the second region 93 in the second substrate 80 where the color filter layer 91 is not formed.

Then, in the same way as the first embodiment, the relief shape layer 50 having the relief underlying layer 51 and the relief overlying layer 52, and the reflection electrode 61 are formed in a region for forming the light reflection portion 12 in the first substrate 10, and a ITO film is deposited and patterned in the same way as the first embodiment to form the transparent electrode (not shown) in the light transparent portion 11 of the first substrate 10.

In the same way as the first embodiment, the color filter layer 91 and the flattening film 94 are formed in the second substrate 80. An alignment layer (not shown) is formed and aligned each in the first substrate 10 and the second substrate 80, and then two substrates are bonded, injected therebetween with liquid crystal as the liquid crystal layer 19, and sealed to form a liquid crystal panel.

The retardation film, the polarizing plate, the backlight, and the drive circuit are arranged to produce the liquid crystal display device.

In the present embodiment, in the same way as the first embodiment, the light illuminated to the light reflection portion 12 is additively mixed and displayed in the first region 92 and the second region 93 of the second substrate 80, so the reflective display is carried out at the luminance close to the transmissive display. The layer thickness difference adjustment layer 46 formed in a formation region of the light reflection portion 12 face the second region 93 decreases the difference of the layer thickness of the liquid crystal layer 19 generated by the step between the first region 92 and the second region 93 due to the color filter layer 91 and reduces the difference of the retardation of the liquid crystal layer between the first region 92 and the second region 93, so the uniform display can be obtained and the contrast can be improved.

In the present embodiment, the layer thickness difference adjustment layer 46 is formed by simple method such as photolithography by using photosensitive resin. Therefore, the production can be performed in high production efficiency in the present embodiment.

Therefore, according to the present embodiment, a high luminance and a high contrast can be obtained each in the reflective display and the transmissive display to realize a superior color repeatability and improve an image quality in a color display by a transflective liquid crystal display device in which the reflective display and the transmissive display are jointly used. And according to the present embodiment, a production thereof can be performed in high production efficiency.

Fourth Embodiment

Figure 12:
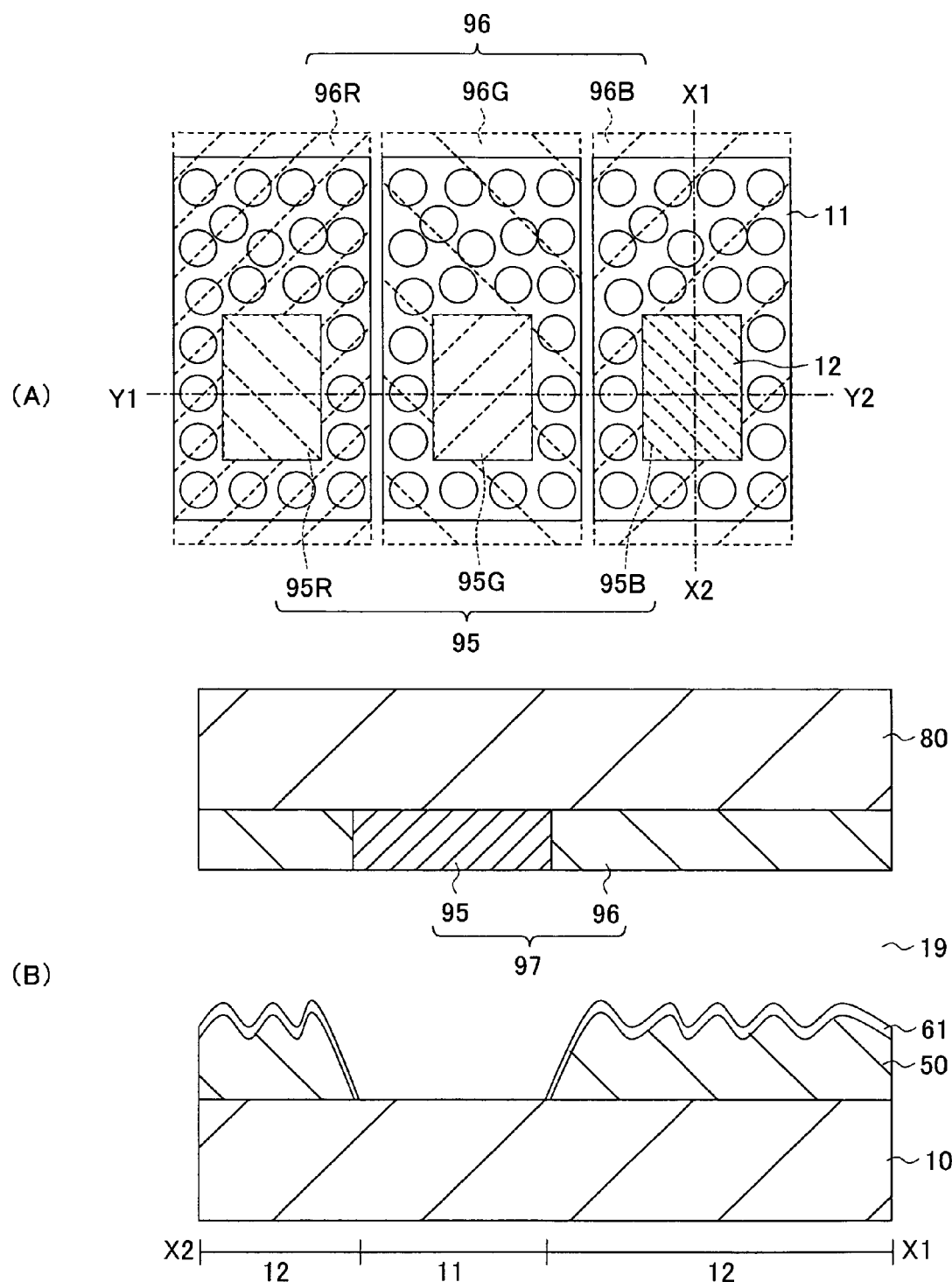
FIG. 12 is a schematic view illustrating a configuration of a liquid crystal display device of a fourth embodiment according to the present invention.

FIG. 12 is a schematic view illustrating a configuration of a liquid crystal display device of the fourth embodiment. In FIG. 12, FIG. 12(A) is a plane view illustrating the surface portion of the first substrate 10, where the color filter layer formed in the second substrate 80 is expressed by a dot line, and FIG. 12(B) is a cross-sectional view illustrating a pixel portion of the liquid crystal display device along the line X1-X2 of FIG. 12(A).

The liquid crystal display device in the present embodiment differs from the same of the first embodiment. The region in the second region 80 facing the region where the light reflection portion is formed does not have the first region where the color filter layer is formed in the predetermined thickness and the second region where the color filter layer is not formed, and also does not have the flattening layer. Further, the layer thickness difference adjustment layer is not formed in the first substrate 10. Instance, a color filter layer 97 in the present embodiment has a first color filter layer 95 formed at a predetermined color density in a region facing the light transmission portion 12 and a second color filter layer 96 formed in the approximately same thickness as the first color filter layer 95 in a region facing the light reflection portion 12 and formed at the color density lower than the first color filter layer 95. Except for the above points, the present invention is the same way as the first embodiment. Therefore, explanations of similarly portions are omitted.

As shown in FIG. 12, the liquid crystal display device of the present embodiment is provided with the first substrate 10, the second substrate 80, and a liquid crystal layer 19. The first substrate 10 is separately arranged to face the second substrate 80, and the liquid crystal layer 19 is arranged between the first substrate 10 and the second substrate 80.

The second substrate 80 is formed with a color filter layer 97 passing and coloring a front light and a back light. The color filter layer 97 in the present embodiment has the first color filter layer 95 formed at a predetermined color density in the region facing the light transmission portion 11, and the second color filter layer 96 formed at the approximately same layer thickness as the first color filter layer 95 in the region facing the light reflection portion 12 and formed at the color density higher than the first color filter layer 95. The first color filter layer 95 is formed to have the color density about twice of the second color filter layer 96.

The color filter layer 97 includes the primary colors of red, green and blue as a set, in which a red color filter layer 97R has for example a first color filter layer 95R having the color density of deep red and a second color filter layer 96R having the color density of pale red, a green color filter layer 97G has for example a first color filter layer 95G having the color density of deep green and a second color filter layer 96G having the color density of pale green, and a blue color filter layer 97B has for example a first color filter layer 95B having the color density of deep blue and a second color filter layer 96B having the color density of pale blue. Each of the color filter layers 97 is formed by polyimide resin containing pigments, dyes, or other colorants, and formed in thickness of 1 µm to overlap each other in the entire region.

Also, in the second substrate 80, a common electrode (not shown) of ITO is formed on the flattening film 94.

On the other hand, in the first substrate 10, the light transmission portion 11 and the light reflection portion 12 are formed in parallel as a pixel portion, and the reflective display and the transmissive display can be jointly used as transflective type.

Figure 13:
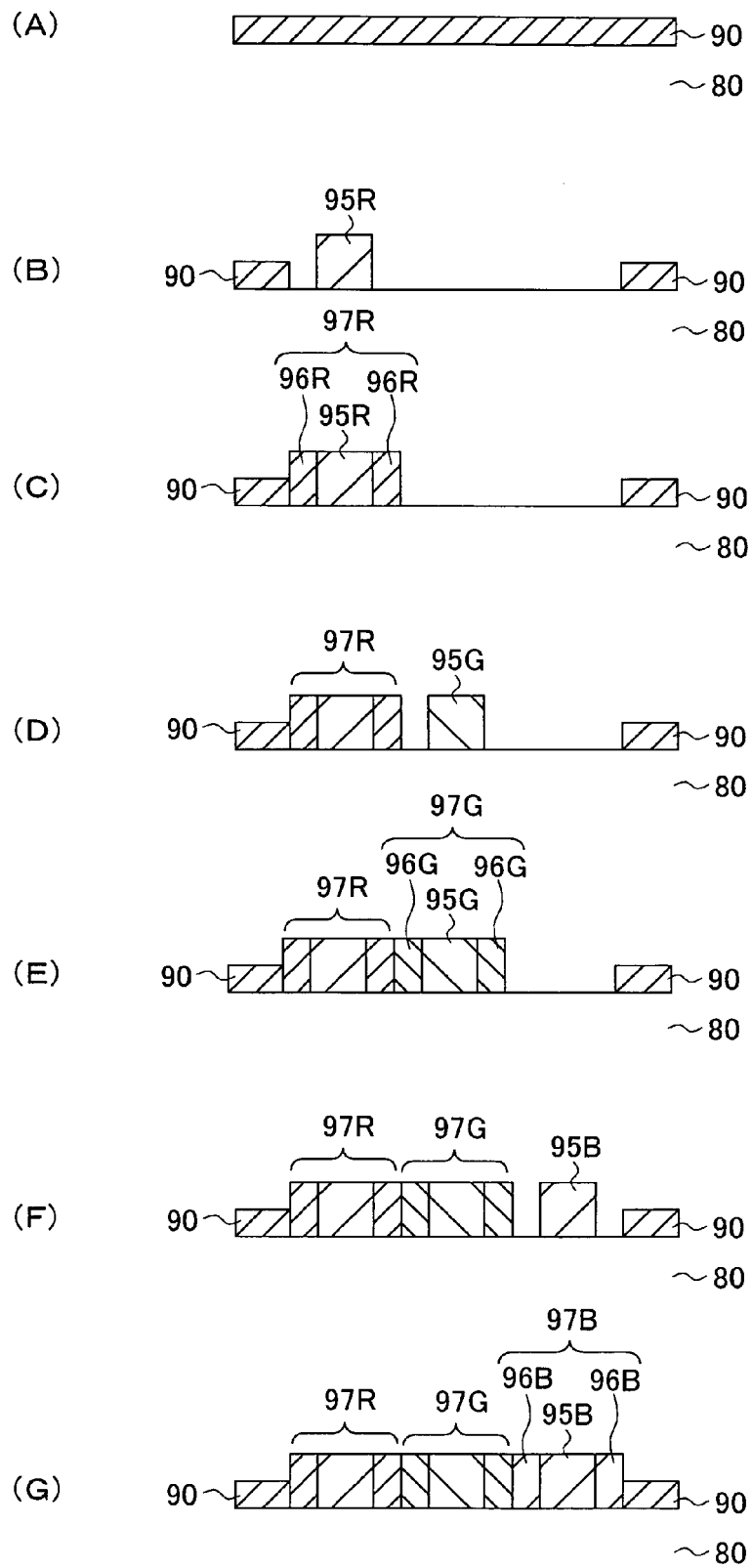
FIG. 13 is a cross-sectional view for illustrating a production step of a color filter layer in a second substrate in a method for producing the liquid crystal display device of the fourth embodiment according to the present invention.

Next, a method for producing the liquid crystal display device according to the present embodiment will be described. FIG. 13 is a cross-sectional view illustrating a production step for forming the color filter layer 97 on the second substrate 80 in the method for producing the liquid crystal display device in the present embodiment, in which a portion along the line Y1-Y2 of FIG. 12 is illustrated.

As shown in FIG. 13(A), a film of chromium oxide is formed on the entire surface of the second substrate 80 to form a black colored metal black layer 90.

As shown in FIG. 13(B), the metal black layer 90 is patterned so as to surround a formation region of the color filter layer 97, and a red first color filter layer 95R is formed by patterning in the region facing the light transmission portion 11 of the first substrate 10, which is a region for forming the red color filter layer 97R.

As shown in FIG. 13(C), the red second color filter layer 96R having the color density lower than the red first color filter layer 95R is formed so as to have the approximately same thickness as the red first color filter layer 96R by patterning in a region facing the light reflection portion 12 of the first substrate 10, which is a region for forming the red color filter layer 97R. Here, the red second color filter layer 96R is formed so as to have about half color density of the red first color filter layer 95R.

As shown in FIG. 13(D), a green first color filter layer 95G is formed by patterning in the region facing the light transmission portion 11 of the first substrate 10, which is a region for forming the green color filter layer 97G.

As shown in FIG. 13(E), the green second color filter layer 96G having the color density lower than the green first color filter layer 95G is formed by patterning so as to have the approximately same thickness as the green first color filter layer 96G in a region facing the light reflection portion 12 of the first substrate 10, which is a region for forming the green color filter layer 97G. Here, the green second color filter layer 96G is formed so as to have about half color density of the green first color filter layer 95G.

As shown in FIG. 13(F), a blue first color filter layer 95B is formed by patterning in the region facing the light transmission portion 11 of the first substrate 10, which is a region for forming the blue color filter layer 97B.

As shown in FIG. 13(G), the blue second color filter layer 96B having the color density lower than the blue first color filter layer 95B is formed by patterning so as to have the approximately same thickness as the blue first color filter layer 96B in a region facing the light reflection portion 12 of the first substrate 10, which is a region for forming the blue color filter layer 97B. Here, the blue second color filter layer 96B is formed so as to have about half color density of the blue first color filter layer 95B. As described above, the color filter layer 97 is formed.

After forming the color filter layer 97, an ITO film of the counter electrode is formed.

Except for forming the layer thickness difference adjustment layer, the semiconductor element, and the light transmission portion and the light reflection portion are formed in the first substrate 10 side in the same way as the first embodiment.

The alignment layer (not shown) is formed and aligned each in the first substrate 10 and the second substrate 80. Two substrates are bonded, injected therebetween with liquid crystal of the liquid crystal layer 19, and sealed to form a liquid crystal panel.

The retardation film, the polarization plate, the backlight, and the drive circuit are for example provided to produce the liquid crystal display device.

According to the present embodiment, the color filter layer 97 formed on the second substrate 80 has the first color filter layer 95 formed in the region facing the light transmission portion 11 at a predetermined color density and the second color filter layer 96 formed at the approximately same thickness as the first color filter layer 95 in the region facing the light reflection portion 12 and formed in the color density lower than the first color filter layer 95. The light illuminated to the light transmission portion 11 passes through the first color filter layer 95, while the light illuminated to the light reflection portion 12 passes through the second color filter layer 96, is reflected at the light reflection portion 12, and passes through the second color filter layer 96 again. The second color filter layer 96 is formed at the color density lower than the first color filter layer at the approximately same thickness as the same, so the reflective display and the transmission display can be obtained at the luminance close to each other.

In the present embodiment, the first color filter layer 95 is formed at about twice color density of the second color filter layer 96. As described above, the light illuminated to the light transmission portion 12 passes through the second color filter layer 96 once, while the light illuminated to the light reflection portion 11 passes through the second color filter layer 96 twice. Therefore, the light illuminated to the light reflection portion 12 and the light illuminated to the light reflection portion 12 are colored at the approximately same color density each other, so the uniform display can be obtained in the reflective display and the transmissive display, consequently, the contrast can be improved and the color repeatability can be obtained close to each other.

Therefore, according to the present embodiment, a high luminance and a high contrast can be obtained each in the reflective display and the transmissive display to realize a superior color repeatability and improve an image quality in a color display by the transflective liquid crystal display device in which the reflective display and the transmissive display are jointly used.

Fifth Embodiment

Figure 14:
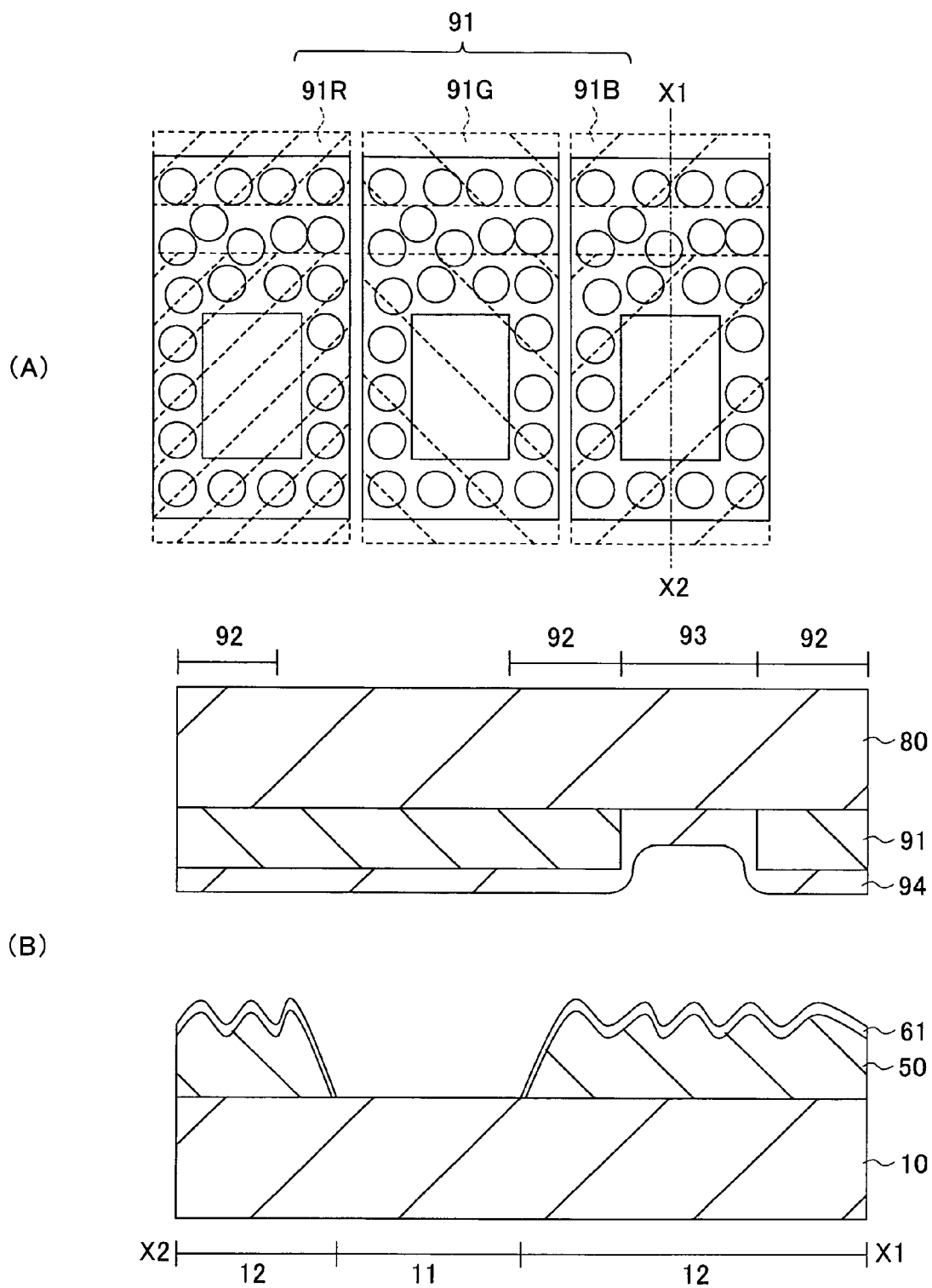
FIG. 14 is a schematic view illustrating a configuration of a liquid crystal display device of a fifth embodiment according to the present invention.

FIG. 14 is a schematic view illustrating a configuration of a liquid crystal display device in the fifth embodiment. In FIG. 14, FIG. 14(A) is a plane view illustrating a surface portion of the first substrate 10, in which a color filter layer formed on the second substrate 80 is expressed by a dot line, and FIG. 14(B) is a cross-sectional view illustrating a pixel portion of the liquid crystal display device along the line X1-X2 of FIG. 14(A).

The liquid crystal display device in the present embodiment differs from the same in the first embodiment in that the layer thickness difference adjustment layer is not formed in the formation region of the light reflection portion in the first substrate facing the second region. Except for not forming the layer thickness difference adjustment layer, the present embodiment is the same as the first embodiment. Therefore, explanations of similarly portions are omitted.

As shown in FIG. 14, in the liquid crystal display device in the present embodiment, a color filter layer 91 having a red color filter layer 91R, a green color filter layer 91B, a blue color filter layer 91B of the primary colors as a set, is formed on the second substrate 80 in the same way as the first embodiment. Specifically, a region in the second substrate 80 facing the region for forming the light reflection portion 12 includes the first region where the color filter layer 91 is formed in a predetermined thickness and the second region 93 where the color filter layer 91 is not formed, and the first region 92 and the second region 93 form the step. And the flattening film 94 having transparency and for flattening and reducing the step between the first region 92 and the second region 93 due to the color filter layer 91 is formed on the second substrate 80.

Next, a method for producing the liquid crystal display device in the present embodiment will be described.

In the same way as the first embodiment, TFT is formed and the relief shape layer 50 and the reflection electrode 61 are formed, and a ITO film is deposited and patterned to form the transparent electrode (not shown) in the light transparent portion 11 of the first substrate 10.

In the same way as the first embodiment, the color filter layer 91 and the flattening film 94 are formed in the second substrate 80. An alignment layer (not shown) is formed and aligned each in the first substrate 10 and the second substrate 80, then two substrates are bonded, injected therebetween with liquid crystal of the liquid crystal layer 19, and sealed to form a liquid crystal panel.

The retardation film, the polarizing plate, the backlight, and the drive circuit are arranged to produce the liquid crystal display device.

In the present embodiment, in the same way as the first embodiment, the light illuminated to the light reflection portion 12 is additively mixed and displayed in the first region 92 and the second region 93 of the second substrate 80, so the reflective display is carried out at the luminance close to the transmissive display. The formation of the flattening film 94 decreases the difference of the layer thickness of the liquid crystal layer 19 generated by the step between the first region 92 and the second region 93 due to the color filter layer 91. As a result, the difference of the retardation of the liquid crystal layer between the first region 92 and the second region 93 is reduced, so the uniform display can be obtained and the contrast can be improved.

Therefore, according to the present embodiment, a high luminance and a high contrast can be obtained each in the reflective display and the transmissive display to realize a superior color repeatability and improve an image quality in a color display by the transflective liquid crystal display device in which the reflective display and the transmissive display are jointly used.

Note that, the above embodiments of the present invention is not limited thereto, various modifications may be applied.

For example, in the above embodiments, while the reflection portion is formed with the relief shaped surface for diffusing and reflecting the front light, the portion may be formed with a flat surface to reflect the light directly, which allows the same effect.

For example, in the above embodiments, while relief shaped layer is formed by two layers of the relief underlying layer and the relief overlying layer for diffusing and reflecting the light at the reflection portion, a single photosensitive film may be formed and a halftone exposure is performed to form a relief shape on its surface to thereby form the relief shaped layer.

For example, the above embodiments is described in the case of normally black mode as the liquid crystal display mode, a markedly effect may also be obtained in the same way in electrically controlled birefringence (EBC) mode.

For example, while the flattening film is formed on the color filter layer of the second substrate in the above first to third embodiments, the same effect can be obtained if not forming the flattening film.

INDUSTRIAL APPLICABILITY

The present invention can be applied to a transflective liquid crystal display device in which a reflective display and a transmissive display are jointly used and a method for producing the same.

The invention claimed is:

1. A liquid crystal display device comprising:
a first substrate having a pixel portion with a light reflection portion and a light transmission portion;
a second substrate facing said first substrate with a color filter layer on a side of the substrate facing said first substrate;
a layer thickness difference adjustment layer on said light reflection portion of said first substrate and facing said second substrate; and
a liquid crystal layer between said first substrate and said second substrate, wherein,
said second substrate includes a first region having said color filter layer and a second region without said color filter layer,
a step between said first region and said second region results from the presence of the color filter layer in said first region and the absence of the color filter in the second region,
said thickness difference adjustment layer is positioned to overlap with said second region and adjusts for a thickness difference of said liquid crystal layer generated by the step, said thickness difference adjustment layer having the same thickness as that of the color filter layer in the first region.

2. A liquid crystal display device as set forth in claim 1, wherein a transparent flattening film of varied thickness for reducing the height of the step is on said second substrate.

3. A method for producing a liquid crystal display device said liquid crystal display device comprising a first substrate having a pixel portion with a light reflection portion and a light transmission portion, a second substrate facing said first substrate with a color filter layer on a side of said second substrate facing said first substrate said second substrate having a first region with said color filter layer having a predetermined thickness and a second region with no color filter, a liquid crystal layer between said first substrate and said second substrate, and a step between said first region and said second region resulting from the presence of the color filter layer in said first region and the absence of the color filter in the second region, the method comprising the step of:
forming a layer thickness difference adjustment layer on said light reflection portion of said first substrate and to overlap with said second region for adjusting the thickness difference of the liquid crystal layer generated by step said thickness difference adjustment layer having the same thickness of the color filter formed in the first region.

4. A method for producing a liquid crystal display device as set forth in claim 3 further comprising the step of forming a transparent flattening film of varied thickness for reducing the height of the step between said first region and said second region.

5. A method for producing a liquid crystal display device as set forth in claim 3 further comprising the step of forming in said first substrate a connection electrode connected to a pixel electrode in said pixel portion,
   wherein the step of forming said connection electrode includes the steps of:
      depositing a connection electrode formation layer for forming said connection electrode in a region for forming said connection electrode, and
      patterning in a predetermined shape said connection electrode formation layer deposited in the region for forming said connection electrode to form said connection electrode, and
      in the step of forming said layer thickness difference adjustment layer, said connection electrode formation layer is deposited in the region for forming said layer thickness difference adjustment layer when said connection electrode formation layer is deposited in the region for forming said connection electrode, and
   said connection electrode formation layer deposited in the region for forming said layer thickness difference adjustment layer is patterned in a predetermined shape to form said layer thickness difference adjustment layer.

6. A method for producing a liquid crystal display device as set forth in claim 5, wherein, in the step of forming said layer thickness difference adjustment layer,
   said connection electrode formation layer deposited in the region for forming said layer thickness difference adjustment layer is patterned in a predetermined shape when said connection electrode formation layer deposited in the region for forming said connection electrode is patterned in a predetermined shape to form said layer thickness difference adjustment layer.

7. A method for producing a liquid crystal display device as set forth in claim 3, further comprising the step of forming in said first substrate a semiconductor element connected to a pixel electrode formed in said pixel region,
   wherein the step of forming said semiconductor element includes the steps of
      depositing an element formation layer for forming said semiconductor element in a region for forming said semiconductor element, and
      patterning in a predetermined shape said element formation layer deposited in the region for forming said semiconductor element, and
   in the step of forming said layer thickness difference adjustment layer, said semiconductor formation layer is deposited in the region for forming said layer thickness difference adjustment layer when said element formation layer is deposited in the region for forming said semiconductor element, and said element formation layer deposited in the region for forming said layer thickness difference adjustment layer is patterned in a predetermined shape to form said layer thickness difference adjustment layer.

8. A method for producing a liquid crystal display device as set forth in claim 7, wherein, in the step of forming said layer thickness difference adjustment layer, said element formation layer deposited in the region for forming said layer thickness difference adjustment layer is patterned in a predetermined shape when said element formation layer deposited in the region for forming said semiconductor element is patterned in a predetermined shape to form said layer thickness difference adjustment layer.

* * * * *